US010618470B1

United States Patent
Tao et al.

(10) Patent No.: US 10,618,470 B1
(45) Date of Patent: *Apr. 14, 2020

(54) APPARATUS TO ADJUST A FIELD OF VIEW DISPLAYED ON AN ELECTRONIC MIRROR USING AN AUTOMOBILE STATE OR A DRIVER ACTION

(71) Applicant: Ambarella, Inc., Santa Clara, CA (US)

(72) Inventors: Shih-Hsuan Tao, San Jose, CA (US); Leslie D. Kohn, Saratoga, CA (US); Jeffery Campbell, Warkworth (CA)

(73) Assignee: Ambarella International LP, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/282,620

(22) Filed: Feb. 22, 2019

Related U.S. Application Data

(63) Continuation of application No. 15/040,106, filed on Feb. 10, 2016, now Pat. No. 10,239,456.

(51) Int. Cl.
| | | |
|---|---|---|
| *H04N 7/00* | (2011.01) |
| *B60R 1/08* | (2006.01) |
| *G06F 3/0488* | (2013.01) |
| *H04N 7/18* | (2006.01) |

(52) U.S. Cl.
CPC ............ *B60R 1/081* (2013.01); *G06F 3/0488* (2013.01); *H04N 7/183* (2013.01); *B60R 2300/207* (2013.01); *B60R 2300/8026* (2013.01)

(58) Field of Classification Search
CPC .. B60R 1/00; B60R 1/04; B60R 1/081; B60R 1/12; B60R 2001/1253; B60R 2300/207; B60R 2300/303; B60R 2300/306; B60R 2300/307; B60R 2300/70; B60R 2300/8026; H04N 7/183
USPC ........................................................ 348/148
See application file for complete search history.

(56) References Cited

U.S. PATENT DOCUMENTS

| | | | |
|---|---|---|---|
| 6,124,647 A | 9/2000 | Marcus et al. ................ | 307/10.1 |
| 7,432,800 B2 | 10/2008 | Harter, Jr. et al. ............. | 340/436 |
| 2007/0061076 A1 | 3/2007 | Shulman ........................ | 701/213 |
| 2011/0115913 A1 | 5/2011 | Lang et al. .................... | 348/148 |

(Continued)

OTHER PUBLICATIONS

Rho, K.H., et al., "Automatic Mirror Adjustment System Using a Driver's Pupils", Depart of Industrial Systems and Information Engineering Korea University, pp. 251-258, Jun. 2002.

(Continued)

*Primary Examiner* — Jessica M Prince
(74) *Attorney, Agent, or Firm* — Christopher P. Maiorana, PC

(57) ABSTRACT

An apparatus comprising an interface to a sensor and a processor. The sensor may be configured to generate a video signal having a first field of view based on a targeted view from a vehicle. The processor may be configured to (A) receive the video signal from the interface, (B) generate a second field of view from the video signal based on (i) the first field of view, (ii) a shape of a display and (iii) an input and (C) present the second field of view from the video signal to the display. The second field of view is a cropped version of the first field of view. The second field of view is generated by adjusting video data in the first field of view. Portions of the first field of view not in the second field of view are hidden portions of the video signal.

20 Claims, 14 Drawing Sheets

(56) References Cited

U.S. PATENT DOCUMENTS

| | | | | |
|---|---|---|---|---|
| 2012/0154591 A1* | 6/2012 | Baur | ............... | B60R 1/00 348/148 |
| 2013/0135089 A1 | 5/2013 | Sejalon et al. | ............... | 340/435 |
| 2013/0321629 A1* | 12/2013 | Zhang | ............... | H04N 17/002 348/148 |
| 2014/0176713 A1* | 6/2014 | Ho | ............... | B60R 1/00 348/148 |
| 2015/0365603 A1* | 12/2015 | Wahl | ............... | G06K 9/00798 348/148 |
| 2016/0129788 A1* | 5/2016 | Deegan | ............... | B60K 35/00 701/36 |
| 2016/0134845 A1* | 5/2016 | Asai | ............... | B60R 1/00 348/234 |
| 2016/0297362 A1* | 10/2016 | Tijerina | ............... | H04N 5/23293 |

OTHER PUBLICATIONS

Pertsel, Shimon et al., "Blind-Spot Monitoring Using Machine Vision and Precise Fov Information", U.S. Appl. No. 14/706,222, filed May 7, 2015, 59 pages.

Pertsel, Shimon et al., "Automatic Mirror Adjustment Using an In-Car Camera System", U.S. Appl. No. 14/639,479, filed Mar. 5, 2015, 50 pages.

Pertsel, Shimon et al., "Electronic Side-Mirror With Multiple Fields of View", U.S. Appl. No. 14/851,500, filed Sep. 11, 2015, 81 pages.

Pertsel, Shimon, "Dynamic Surround Camera System", U.S. Appl. No. 13/949,624, filed Jul. 24, 2013, 25 pages.

Campbell, Jeffery, "System and Method to Adjust the Field of View Displayed on an Electronic Mirror Using Real-Time Physical Cues From the Driver in a Vehicle", U.S. Appl. No. 14/935,688, filed Nov. 9, 2015, 95 pages.

* cited by examiner

APPARATUS TO ADJUST A FIELD OF VIEW DISPLAYED ON AN ELECTRONIC MIRROR USING AN AUTOMOBILE STATE OR A DRIVER ACTION

This application relates to U.S. Ser. No. 15/040,106, filed Feb. 10, 2016, which is incorporated by reference in its entirety.

FIELD OF THE INVENTION

The present invention relates to video capture devices generally and, more particularly, to an apparatus to adjust a field of view displayed on an electronic mirror using an automobile state or a driver action.

BACKGROUND OF THE INVENTION

Electronic mirrors developed for modern automobiles offer advantages over conventional optical or reflective glass based mirrors. Conventional electronic mirrors use a fixed field of view (FOV) for the camera subsystem capturing the rear view scene.

A conventional reflective-glass, rear-facing (or rear view) mirror is mounted on the front windshield in a position allowing a driver to easily change his/her gaze to view in a direction towards the rear of the vehicle. Conventional rear view mirrors have a relatively wide horizontal profile but relatively thin vertical profile. The thin vertical profile allows a driver to use the rear view mirror to see behind the vehicle while creating only a small obstruction when the driver is looking forward through the front windshield of the vehicle. If the cabin of the vehicle and rear window design do not create obstructions, a rear view mirror constructed to have a taller vertical size may offer more visibility behind the vehicle. However, a taller vertical size and/or placement obstructs the forward view of the driver attempting to look through the front windshield.

During the transition from installing traditional reflective mirrors, to installing electronic mirrors in vehicles, electronic mirrors will likely be similarly placed inside the cabin of the vehicle. A placement of the electronic mirror similar to the placement of a traditional reflective mirror will offer the driver a familiarity, which enhances safety. A similar placement also allows for the design of a secondary reflective mirror that may be used as a failsafe in the event the camera-display system of the electronic mirror fails.

Conventional commodity complementary metal-oxide semiconductor (CMOS) sensors are generally rectangular (or square) shaped to align with typical display aspect ratios. Sensor shapes for video display aspect ratios of 16:9 and 4:3 are common. Conventional reflective rear view mirrors and, subsequently, electronic rear view mirrors have a wider horizontal profile and thinner vertical profile than used in common image sensors. To reduce the cost of the electronic mirror subsystem, commodity image sensors are often used when designing electronic mirror subsystems. To comply with the rear view mirror aspect ratio, the full horizontal width of the sensor is utilized but only a cropped subsection of the vertical height of the sensor is actively displayed.

It would be desirable to implement an apparatus to adjust the field of view displayed on an electronic mirror using an automobile state or a driver position or action.

It would also be desirable to have a mechanism to make use of the hidden field of view of the sensor available on demand.

It would also be desirable to alter the field of view of the camera subsystem as a whole when more visibility is needed at the rear of vehicle (i.e., when backing up).

SUMMARY OF THE INVENTION

The present invention concerns an apparatus comprising an interface to a sensor and a processor. The sensor may be configured to generate a video signal having a first field of view based on a targeted view from a vehicle. The processor may be configured to (A) receive the video signal from the interface, (B) generate a second field of view from the video signal based on (i) the first field of view, (ii) a shape of a display and (iii) an input and (C) present the second field of view from the video signal to the display. The second field of view is a cropped version of the first field of view. The second field of view is generated by adjusting video data in the first field of view. Portions of the first field of view not in the second field of view are hidden portions of the video signal.

BRIEF DESCRIPTION OF THE DRAWINGS

Embodiments of the invention will be apparent from the following detailed description and the appended claims and drawings in which:

DETAILED DESCRIPTION OF EMBODIMENTS

Embodiments of the present invention include providing an apparatus that may (i) implement an electronic mirror, (ii)

adjust a field of view displayed, (iii) use an automobile state to make adjustments, (iv) use a driver physical action to make adjustments, (v) physically adjust an orientation of a camera, (vi) digitally move a capture window of video frames and/or (vii) be cost-effective to implement.

Figure 1:
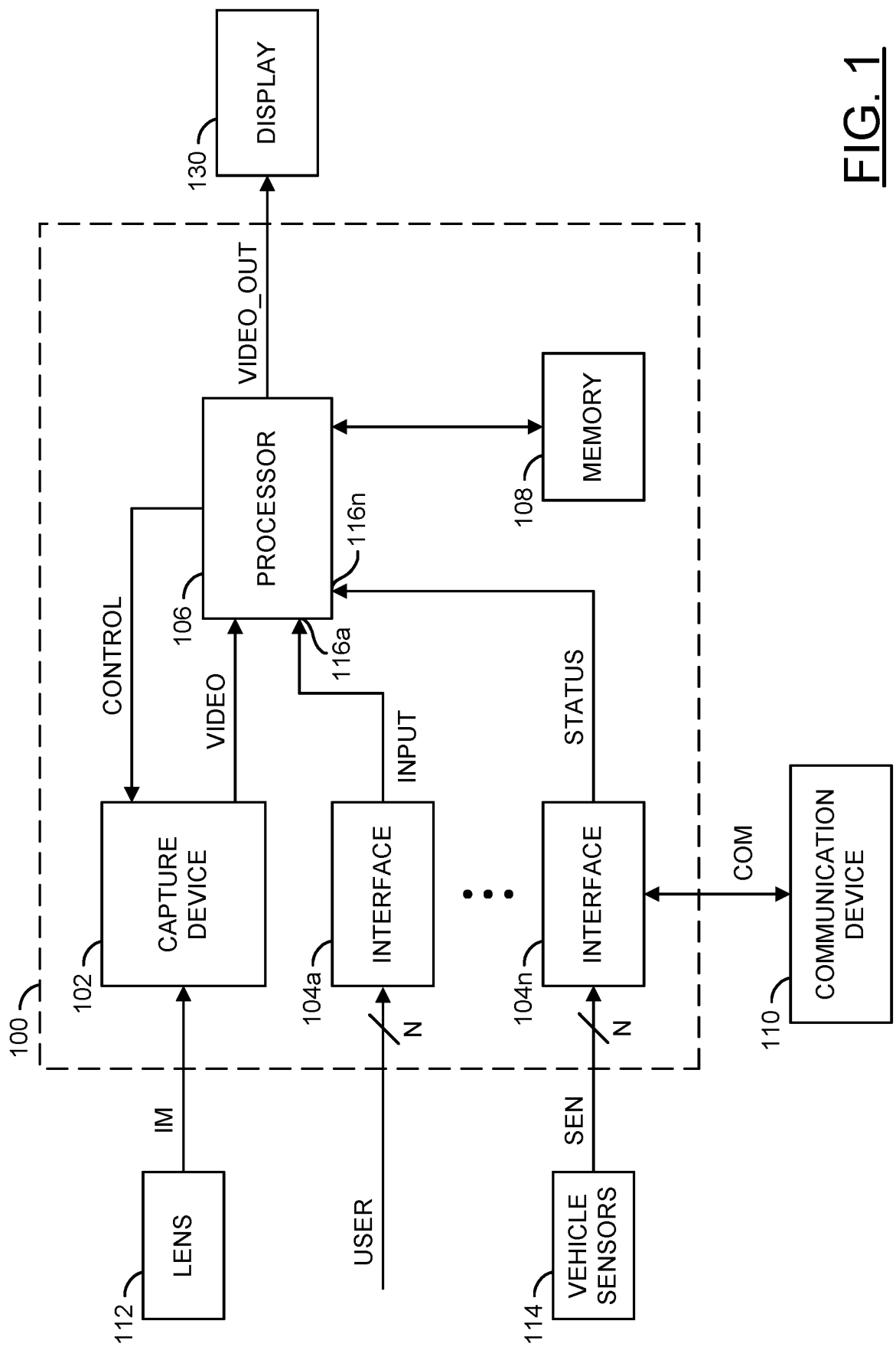
FIG. 1 is a diagram illustrating various components of an electronic mirror system implemented as a single device.

Referring to FIG. 1, a block diagram of an apparatus 100 is shown in accordance with an embodiment of the present invention. The apparatus 100 may be implemented as a control module for an electronic mirror. The apparatus 100 generally comprises a block (or circuit) 102, a number of blocks (or circuits) 104a-104n, a block (or circuit) 106, and a block (or circuit) 108. The circuit 102 may be implemented as a capture device. The circuits 104a-104n may be implemented as interface circuits. The circuit 106 may be implemented as a processor. In an example implementation, the circuit 106 may be implemented as a video processor. The processor 106 may comprise inputs 116a-116n and/or other inputs. The circuit 108 may be implemented as a memory. The capture device 102 may receive a signal (e.g., IM) from a block (or circuit) 112. The apparatus 100 may present a signal (e.g., VIDEO_OUT) to a block (or circuit) 130. The circuit 130 may be a display. The display 130 may be an electronic mirror.

The signal IM may be an image (e.g., an analog image) that is presented by the lens 112 to the capture device 102. The circuit 112 may be implemented as a lens, such as an optical lens. The lens 112 may provide a zooming feature and/or a focusing feature. The lens 112 and/or the capture device 102 may be movable in response to signals received from the processor 106 (to be described in more detail in connection with FIG. 9). The capture device 102 and/or the lens 112 may be implemented, in one example, as a single lens assembly. In another example, the lens 112 may be a separate implementation from the capture device 102. The capture device 102 is shown within the circuit 100. In an example implementation, the capture device 102 may be implemented outside of the circuit 100 (e.g., along with the lens as part of a lens/capture device assembly).

The interface circuits 104a-104n may receive a number of signals. For example, the interface circuit 104a may receive a one or more signals (e.g., USER). The signal USER may represent user inputs. For example, the signal USER may represent a body position of a user while the driver is operating a vehicle. The signal USER may be a hand gesture from a user. In another example, the signal USER may represent the press of a button by the driver operating the vehicle. The signal USER may be implemented as other user specific inputs.

In an example implementation, the interface 104a is shown presenting a signal (e.g., INPUT) to an input 116a of the processor 106. The signal INPUT may represent various user input received by the interface 104a. In an example, the signal INPUT may be a digital signal presented in a format readable by the processor 106.

The interface 104n may receive a signal (e.g., SEN) from one or more vehicle sensors 114. The signal SEN may represent one or more sensor inputs received from one or more vehicle sensors. In one example, the signal SEN may represent status information of the vehicle (e.g., vehicle sensor information for providing information about whether the transmission is in forward, or reverse, whether the vehicle is over a specified or predetermined speed, or other vehicle specific information that may affect the need to position the image shown in the display 130). The circuit 114 may be implemented as one or more sensors (e.g., a location module such as a GPS sensor, an orientation module such as a magnetometer, a temperature sensor, steering wheel sensors, turn indicator signals, any other data communicated via the on-board diagnostics (OBD) port, etc.). Generally, the sensors 114 may be input/output devices separate from the capture device 102.

In an example implementation, the interface 104n is shown presenting a signal (e.g., STATUS) to an input 116n of the processor 106. The signal STATUS may represent various states of a vehicle. The interface 104n may also receive a signal (e.g., COM) from a block (or circuit) 110. The circuit 110 may be an external communication device. The signal COM may be a communications signal received from an antenna, a cellular connection, a near field wireless connection (e.g., Wi-Fi, Bluetooth, etc.), and/or other communications device.

The processor 106 may receive the signal VIDEO from the capture device 102, the signal INPUT from the interface 104a at the input 116a, and the signal STATUS from the interface 104n at the input 116n. The processor 106 may be connected through a bi-directional interface (or connection) to the memory 108. The processor 106 may store and/or retrieve data from the memory 108.

The memory 108 may be configured to store computer readable/executable instructions (or firmware). The instructions, when executed by the processor 106 may perform a number of steps. In some embodiments, the processor 106 may be implemented as a system-on-chip (SoC) and the memory 108 may be a component of the processor 106.

The processor 106 may present a signal (e.g., CONTROL) to the capture device 102. The signal CONTROL may allow the lens 112 and/or the capture device 102 to be rotated to obtain an alternate field of view (e.g., adjusting the FOV). The processor 106 may present the signal VIDEO_OUT to the electronic mirror 130. In an example implementation, the circuit 130 may be a display (e.g., a LCD display), such as a dash display in an automobile, or an e-mirror display. For an example, the e-mirror display 130 may be an electronic mirror positioned in a location of a traditional reflective rear-view mirror in a vehicle.

The processor 106 may be configured to receive the signal VIDEO, the signal INPUT, the signal STATUS and/or other inputs (e.g., at the inputs 116a-116n). The signal VIDEO may comprise video data (e.g., one or more video frames) providing a field of view. The processor 106 may be configured to generate the signal VIDEO_OUT and/or the signal CONTROL. The signal VIDEO_OUT and/or the signal CONTROL may be generated based on one or more decisions made by the processor 106. The decisions made by the processor 106 may be determined based on data received at the inputs 116a-116n received by the processor 106 (e.g., the signal INPUT, the signal STATUS and/or other inputs) and/or based on an analysis of the signal VIDEO. The signal VIDEO_OUT may be presented to the display 130. The signal VIDEO_OUT may be a cropped version of the signal VIDEO. The signal VIDEO_OUT may comprise one or more video frames (e.g., a series of video frames).

The apparatus 100 may allow a field of view (FOV) of a rear-facing electronic mirror to be adjustable. The adjustment may be automatic and/or manual. The adjustments may offer a driver an enhanced view of the area of interest behind the vehicle. The FOV of the rear view e-mirror 130 may be modified by one or a combination of a variety of mechanisms. By allowing the lens 112 and/or the capture device 102 to be physically adjusted, additional FOV may be presented to the display 130. The field of view displayed on the electronic mirror 130 (e.g., VIDEO_OUT) may be changed by adjusting the video data in the signal VIDEO. The apparatus 100 may implement a camera system. In some embodiments, the camera system 100 may be implemented as a drop-in solution (e.g., installed as one component). In an example, the camera system 100 may be a device that may be installed as an after-market product for a vehicle (e.g., a retro-fit for a vehicle). The number and/or types of signals and/or components implemented by the camera system 100 may be varied according to the design criteria of a particular implementation.

Figure 2:
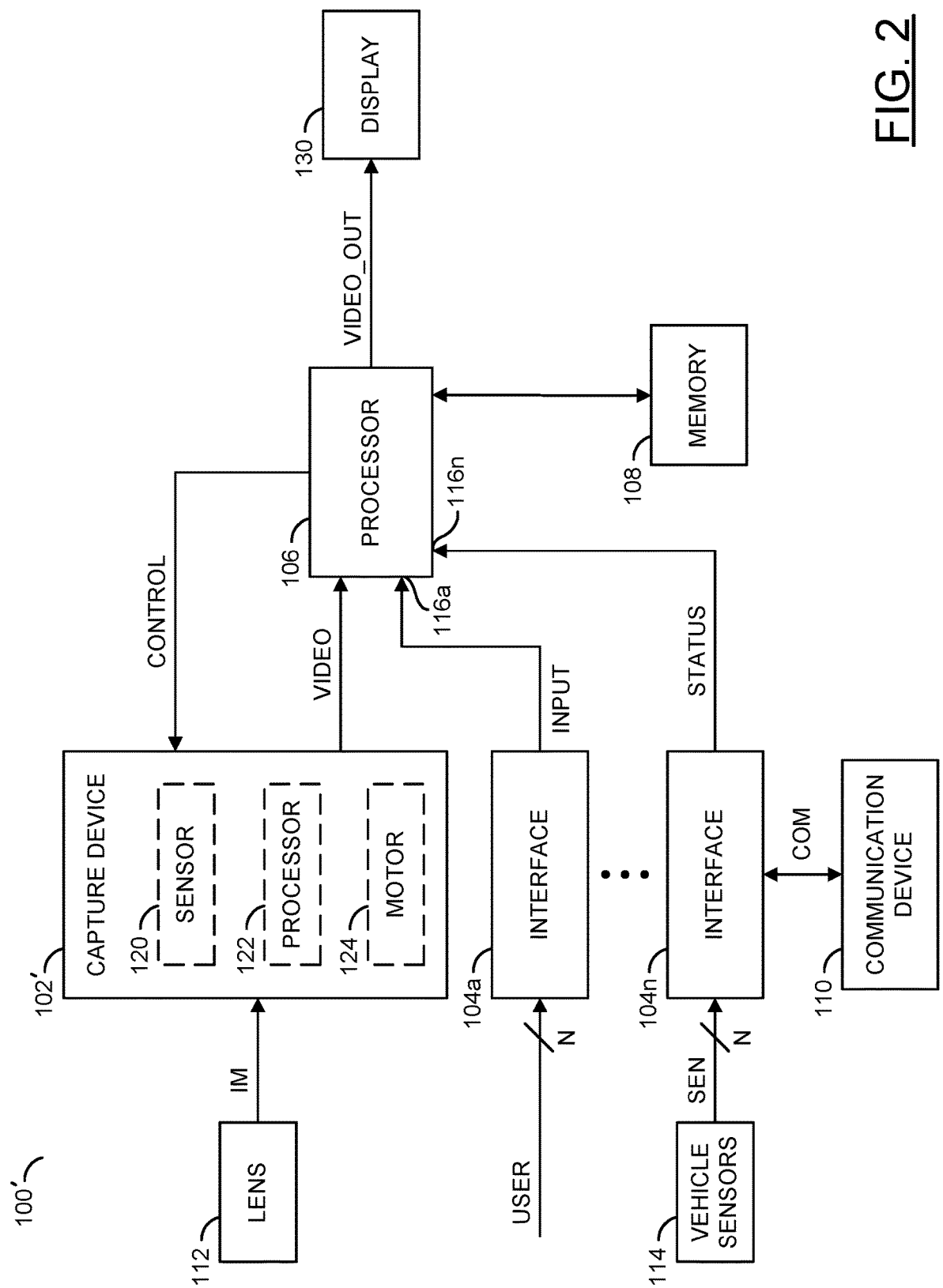
FIG. 2 is a diagram illustrating various components in a distributed system.

Referring to FIG. 2, a diagram illustrating various components in a distributed camera system 100' is shown in accordance with a preferred embodiment of the present invention.

The camera system 100' may comprise the capture device 102', the interfaces 104a-104n, the processor 106, the memory 108, the communication device 110, the lens 112, the vehicle sensors 114 and/or the display 130. The camera system 100' may be a distributed system (e.g., each component may be implemented separately throughout an installation location such as a vehicle). The capture device 102' may comprise a block (or circuit) 120, a block (or circuit) 122 and/or a block (or circuit) 124. The circuit 120 may be a camera image sensor (e.g., a camera sensor separate from the vehicle sensors 114). The circuit 122 may be a processor and/or logic (e.g., a processor separate from the processor 106). The circuit 124 may be a motor (e.g., used to control a direction of the lens 112). The capture device 102' may implement a separate internal memory (e.g., a memory separate from the memory 108 such as a frame buffer).

Figure 3:
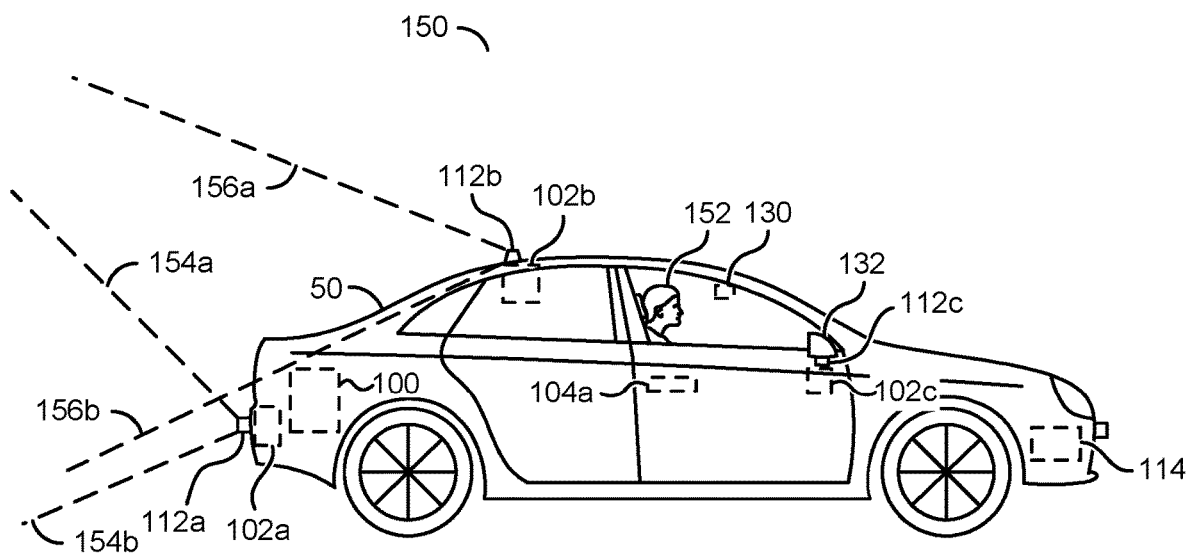
FIG. 3 is a side view of a vehicle.

Referring to FIG. 3, a side view 150 of an automobile/vehicle 50 is shown in accordance with a preferred embodiment of the present invention. The camera system 100 is shown inside the vehicle 50. A driver 152 is shown seated in the vehicle 50. A rear view electronic mirror 130 is shown attached to the vehicle 50. For an example, the rear view electronic mirror 130 is shown located in a position commonly used for conventional reflective rear view mirrors. The vehicle sensors 114 are shown on (or in) the vehicle 50. The interface 104a is shown in the vehicle 50.

In the embodiment 150, the electronic mirror 130 is shown hanging near a front windshield of the vehicle 50. In some embodiments, the electronic mirror 130 may be implemented as part of the interior of the vehicle 50 (e.g., as part of a door panel, as part of a dashboard, as part of an infotainment unit, etc.). The location of the electronic mirror 130 may be varied according to the design criteria of a particular implementation.

A side view mirror 132 is shown. The side view mirror 132 may be implemented as a traditional reflective mirror and/or an electronic mirror similar to the rear-view electronic mirror 130. In some embodiments, the camera system 100 may be configured to adjust the field of view displayed on the rear view electronic mirror 130 and/or the side view electronic mirror 132. In an example, the field of view displayed on the side view electronic mirror 132 may be adjusted by the processor 106 to provide the driver 152 a downward view (e.g., to allow the driver 152 to see how close the vehicle 50 is to a curb when attempting to parallel park). The field of view displayed on the side view electronic mirror 132 may be adjusted by the processor 106 in response to the user input (e.g., the signal INPUT) and/or the various states of the vehicle 50 (e.g., the signal STATUS).

In the embodiment 150, the lens 112a is shown attached to a rear end of the vehicle 50 (e.g., a rear bumper). The lens 112a is shown capturing a targeted view from the vehicle 50. The targeted view is shown as lines 154a and 154b. The targeted view 154a-154b is shown directed towards the rear of (e.g., behind) the vehicle 50. The targeted view 154a-154b may be implemented to capture a view similar (e.g., emulating) a reflective view from a conventional (e.g., reflective) rear-view mirror.

In the embodiment 150, the lens 112b is shown attached to a roof of the vehicle 50 (e.g., roughly where an antenna fin is commonly positioned on various vehicle makes and models). The lens 112b is shown capturing a targeted view from the vehicle 50. The targeted view is shown as lines 156a and 156b. The targeted view 156a-156b is shown directed towards the rear of (e.g., behind) the vehicle 50. The targeted view 156a-156b may be implemented to capture a view similar (e.g., emulating) a reflective view from a conventional (e.g., reflective) rear-view mirror.

The targeted view 154a-154b and/or 156a-156b shown in the side view 150 may represent a vertical portion of the field of view captured by the camera system 100. Generally, the field of view captured by the camera system 100 is larger than the vertical viewable area on the electronic mirror 130. The camera system 100 may be configured to crop portions of the captured video frames to display a portion of the vertical portion of the field of view captured by the camera system 100.

In some embodiments, the lens 112 may be located on another area of the vehicle 50 (e.g., attached to the side view mirror 132, attached to the driver and/or passenger side door, near the rear license plate of the vehicle 50, etc.). In some embodiments, only one lens 112 may be implemented. In some embodiments, the lenses 112a-112b may be implemented. The lenses 112a-112b and/or other implementations of the lenses 112 may implement a rear-facing camera. The location of the lens 112 may be varied according to the design criteria of a particular implementation.

The camera system 100 is shown in the rear of the vehicle 50. The particular location of the camera system 100 may be varied according to the design criteria of a particular implementation. For example, in some embodiments, the vehicle 50 may allow an installation of the camera system 100 in a rear end of the vehicle 50. In other embodiments, the vehicle 50 may allow an installation of the camera system 100 in a front end of the vehicle 50. For example, the camera system 100 may be installed near and/or along with the interface 104a (e.g., in a dashboard of the vehicle 50). In another example, the camera system 100 (or the distributed camera system 100') may be distributed throughout the vehicle 50 (e.g., connections may be implemented between the camera system 100, the capture device 102 and/or the interfaces 104a-104n such as a direct wired connection and/or a connection using a common bus line).

The electronic mirror 130 may be a screen and/or an output device. The electronic mirror 130 may be operational in combination with the capture device 102 and/or the processor 106. The electronic mirror 130 may display a version of video frames (e.g., the targeted view from the vehicle 50) captured by one or more of the lenses 112a-112b and/or the capture devices 102b. The video frames captured by the lenses 112a-112b and/or the capture device 102b may be cropped, adjusted and/or encoded by the processor 106. The cropped, adjusted and/or encoded video frames may be displayed by the electronic mirror 130. For example, the processor 106 may provide real-time video streaming to the electronic mirror 130.

Generally, a field of view displayed on the electronic mirror 130 may be implemented to emulate a view from a conventional reflective rear-view mirror. The field of view displayed on the electronic mirror 130 may be adjusted based on a selection by the driver 152 using manual controls in the vehicle 50 available to the driver 152 via the interface 104a (e.g., buttons on a panel on the inside of the door beside the driver 152, buttons on a center console, an interface on a touchscreen, buttons on a steering wheel, etc.). For example, the decision made by the processor 106 to determine the field of view to select may be based on parameters and/or data received by input 116a by the driver 152. The camera system 100 may select the field of view displayed on the electronic mirror 130 based on the field of view selected by the driver 152 (e.g., the signal INPUT). In some embodiments, the camera system 100 may select the field of view to display on the electronic mirror 130 based on status information from the vehicle 50 (e.g., the signal STATUS). For example, the decision made by the processor 106 to determine the field of view to select may be automated based on the status information received by the input 116n from the vehicle 50. Selecting between the fields of view may provide video frames to the electronic mirror 130 that provide the driver 152 alternate viewing angles and/or vertical portions of the captured video frames.

The camera system 100 may be configured to analyze the captured video signal. The camera system 100 may detect objects in the captured video signal (e.g., automobiles, bicycles, pedestrians, animals, parking spaces, etc.). The camera system 100 may be configured to determine an absolute location and/or a relative location of the detected objects. Based on the detected objects, the processor 106 may determine a position (e.g., a distance) of the objects relative to the vehicle 50. If the detected objects are determined to be in a blind spot of the driver 152 (e.g., an estimated blind spot of the driver 152), the camera system 100 may present data from signals received at the input 116a-116n to the processor 106. Data received at the input 116a-116n may be used to select one of the fields of view to be displayed on the electronic mirror 130.

The vehicle sensors 114 are shown attached to (or in) the vehicle 50. Multiple types of the vehicle sensors 114 may be implemented. The vehicle sensors 114 may be used to determine the status information (e.g., the signal STATUS). In some embodiments, the vehicle sensors 114 may communicate with an on-board diagnostic (OBD) port of the vehicle 50. For example, the vehicle sensors 114 may monitor a direction of movement of the vehicle 50. The direction of movement of the vehicle 50 may be used to determine which field of view to display on the electronic mirror 130. In another example, turn signals may be monitored. The activation of the turn signals by the driver 152 may indicate which direction the vehicle 50 may be moving. The direction of the vehicle may be used to select an appropriate field of view to display on the electronic mirror 130.

The interface 104a may be located near the driver 152 (e.g., in a dashboard of the vehicle 50, as buttons on the steering wheel, options on a touchscreen display of an infotainment unit, buttons on a center console, etc.). The interface 104a may be used by the driver 152 to select between the fields of view to be displayed on the electronic mirror 130. For example, the interface 104a may provide two buttons (e.g., up and down). The two buttons may be used to select between different portions of the vertical field of view.

In another example, the interface 104a may implement voice recognition to allow the driver 152 to speak a command to switch between the various fields of view. The implementation of the interface 104a may be varied according to the design criteria of a particular implementation. The interface 104a may provide the signal INPUT to the processor 106.

The vehicle sensors 114 may implement a sensor array. The sensor array may be used to determine the position of objects in close proximity to the vehicle 50. For example, the vehicle sensors 114 may implement a radar device, an array of radars, a sonar device, an array of sonars, a LIDAR device, an array of LIDAR devices, an ultra-sound device, an array of ultra-sound devices, etc. The types of the vehicle sensors 114 used to detect a proximity to other objects may be varied according to the design criteria of a particular implementation.

Figure 4:
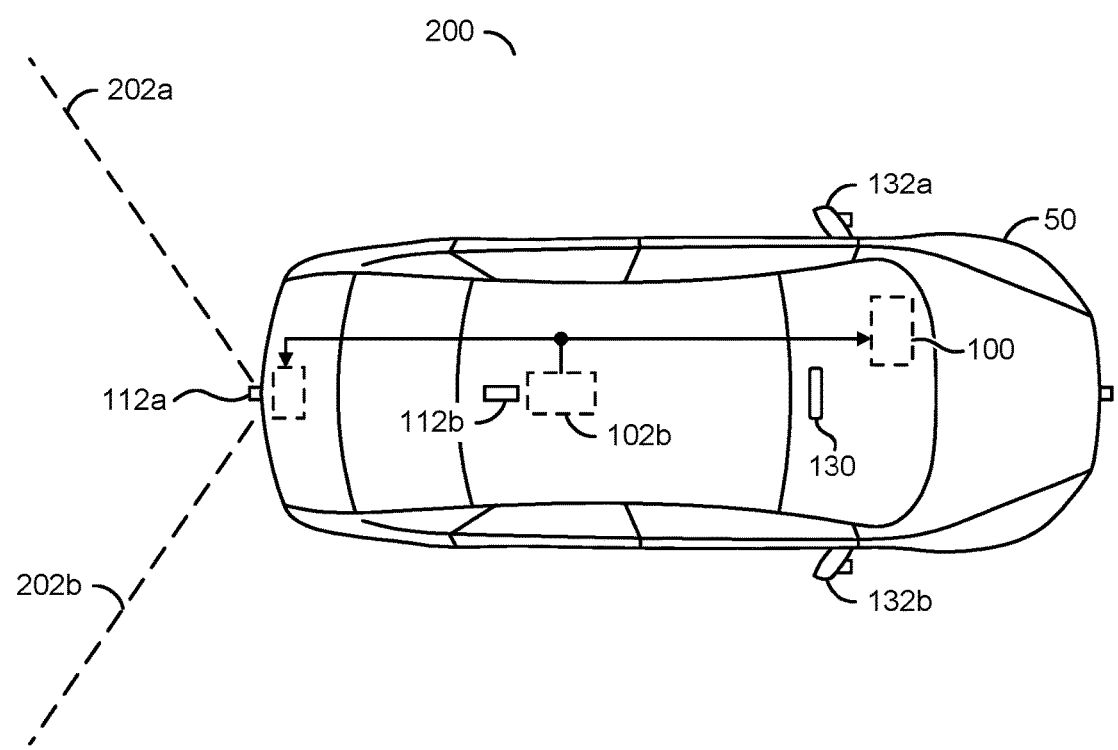
FIG. 4 is a top view of a vehicle.

Referring to FIG. 4, a top view 200 of the vehicle 50 is shown in accordance with a preferred embodiment of the present invention. A line 202a and a line 202b are shown extending from the lens 112a. The lines 202a-202b may represent a horizontal representation of the field of view captured by the camera system 100. Since the field of view captured by the camera system 100 is from the lens 112a mounted external to the vehicle 50, the targeted view displayed by the electronic mirror 130 may differ from the reflective view seen on a conventional reflective rear-view mirror (e.g., a reflection that includes an interior of the vehicle is visible in the reflection of a conventional reflective rear-view mirror). Mounting the lens 112a externally may provide a safety advantage by providing the driver 152 with a targeted view directed towards the rear of the vehicle 50 without displaying obstructions in the interior of the vehicle (e.g., the frame of the vehicle 50, car seats, limited rear windshield size, etc.).

The capture device 102a (or 102b) is shown connected to the camera system 100 by a common bus line. Based on the decision made by the processor 106, the electronic mirror 130 may display a cropped version of the field of view captured by the capture device 102a. For an example, since the shape of the electronic mirror 130 is wide, all (or most) of the horizontal field of view 202a-202b may be displayed by the electronic mirror 130 and since the shape of the electronic mirror 130 has a relatively small vertical length a portion of the vertical field of view 154a-154b may be displayed by the electronic mirror 130. The vertical portion displayed by the electronic mirror 130 may be based on the decisions performed by the processor 106 (e.g., the user input signal INPUT and/or the vehicle status signal STATUS).

Figure 5:
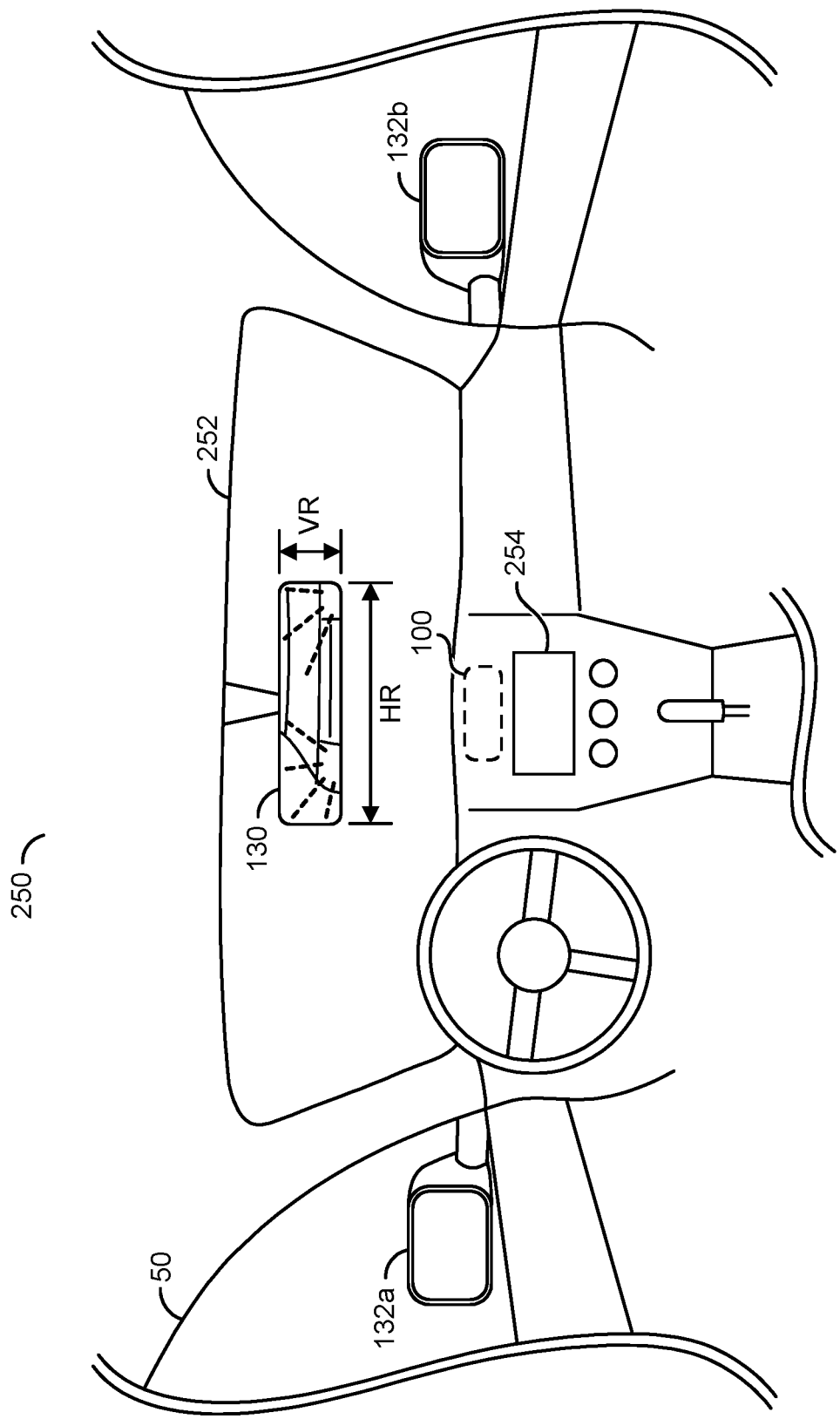
FIG. 5 is a diagram of an interior of a vehicle.

Referring to FIG. 5, a diagram 250 of an interior of the vehicle 50 is shown in accordance with a preferred embodiment of the present invention. The camera system 100 is shown as part of a dashboard of the vehicle 50. The electronic mirror 130 is shown mounted to a windshield 252 of the vehicle 50.

An infotainment unit 254 is shown. The infotainment unit 254 may be a device installed in the vehicle 50 used to control various components of the vehicle 50 (e.g., radio, air conditioning, heat, etc.) and/or provide various information (e.g., GPS information, weather, warnings from the vehicle sensors 114, etc.). In some embodiments, buttons may be provided for the driver 152 to interact with the infotainment unit 254. In some embodiments, the infotainment unit 254 may implement a touchscreen interface. The buttons and/or touchscreen interface may be the input USER for the interface 104a. In some embodiments, the infotainment unit 254 may be a stock component of the vehicle 50 and the camera system 100 may leverage existing functionality of the infotainment unit 254.

In some embodiments, the electronic mirror 130 may be mounted in a similar location as a conventional reflective rear-view mirror. In some embodiments, the electronic mirror 130 may be a display on the infotainment unit. The location and/or design of the electronic mirror 130 may be varied according to the design criteria of a particular implementation.

The electronic mirror 130 is shown having a horizontal dimension distance HR. The electronic mirror 130 is shown having a vertical dimension distance VR. The dimension HR and the dimension VR may be similar to the dimensions of a conventional reflective rear-view mirror (e.g., large enough to provide information to the driver 152, but not large enough to significantly obstruct the forward view of the driver 152 through the windshield 252). Generally, the dimension VR (e.g., the vertical profile) is smaller than the dimension HR (e.g., the horizontal profile).

Figure 6:
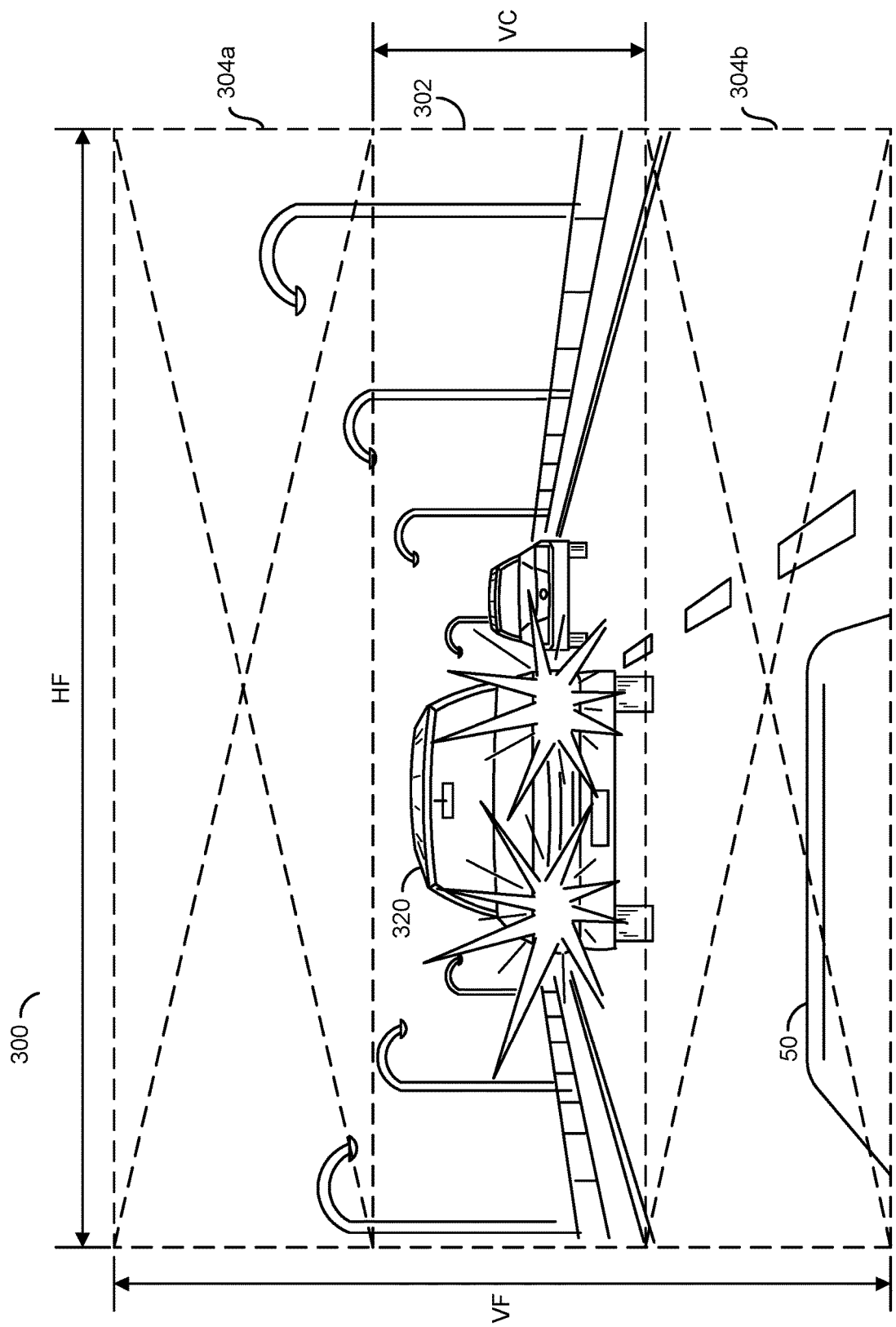
FIG. 6 is a diagram illustrating an image captured by a sensor.

Referring to FIG. 6, a view from the capture device 102 is shown in accordance with a preferred embodiment of the present invention. A video frame 300 is shown (e.g., one example video field of view captured by the capture device 102). A tailing vehicle 320 is shown in the video frame 300. A portion of the vehicle 50 is shown in the video frame 300 (e.g., the example video frame 300 may be a targeted view captured by the lens 112b mounted on the roof of the vehicle 50).

The video frame 300 may have a horizontal dimension HF. The video frame 300 may have a vertical dimension VF. The dimension HF and the dimension VF may be based on a size of the sensor 120. The aspect ratio of the dimension HF and the dimension VF may be different than the aspect ratio of the dimension HR and the dimension VR of the electronic mirror 130. In an example, the entire video frame 300 may not fit on the electronic mirror 130 without distorting the video frame 300.

A capture window 302 is shown. The capture window 302 may be a portion of the video frame 300 sent to the electronic mirror 130 (e.g., the capture window 302 is the portion of the video frame 300 output on the display 130). A location of the capture window 302 may be movable. In the example shown, the capture window 302 is shown in a middle portion of the video frame 300. The capture window 302 may move (e.g., in any direction) to show different portions of the video frame 300. In an example, the capture window 302 may move up or down to capture different vertical portions of the video frame 300 for display on the electronic mirror 130. The size, location and/or shape of the capture window 302 may be varied according to the design criteria of a particular implementation.

The capture window 302 is shown having the horizontal dimension HF. The capture window 302 is shown having a vertical dimension VC. An aspect ratio of the capture window 302 (e.g., HF:VC) may correspond to the aspect ratio of the electronic mirror 130 (e.g., HR:VR). In an example, the capture window 302 may be displayed on the electronic mirror 130 with little or no distortion.

The video frame 300 may have one or more hidden portions 304a-304b. In the example shown, the hidden portion 304a is a portion of the video frame 300 above the capture window 302 and the hidden portion 304b is a portion of the video frame 300 below the capture window 302. In some embodiments, the hidden portion 304a may not exist (e.g., the capture window 302 covers the top-most portion of the video frame 300 and the vertical length of the hidden portion 304a is zero). In some embodiments, the hidden portion 304b may not exist (e.g., the capture window 302 covers the bottom-most portion of the video frame 300 and the vertical length of the hidden portion 304b is zero). In the example shown, each of the hidden portions 304a-304b appears roughly the same size as the capture window 302. However, the sizes of the capture window 302 and the hidden portions 304a-304b may be varied according to the design criteria of a particular implementation.

The processor 106 may be configured to move the capture window 302. Moving the capture window 302 may implement a digital panning action. Performing a digital panning action (e.g., a movement such as a horizontal movement, a vertical movement and/or a combination of horizontal and vertical movement) may adjust the video data from the field of view captured in the video frame 300. For example, moving the capture window 302 may make the hidden portions 304a-304b available on demand (e.g., in response to the signal INPUT from the driver 152). The processor 106 may transmit the capture window 302 to the electronic mirror 130 for display. The processor 106 may crop out the hidden portions 304a-304b of the video frame 300. The cropped portion of the video frame 300 (e.g., the capture window 302) may be presented to the electronic mirror 130 as the signal VIDEO_OUT.

The capture device 102 may be configured to capture video image data (e.g., the signal IM from the lens 112). In some embodiments, the capture device 102 may be a video capturing device such as a camera. The capture device 102 may capture data received through the lens 112 to generate a bitstream (e.g., generate video frames). For example, the capture device 102 may receive light from the lens 112. The lens 112 may be directed, tilted, panned, zoomed and/or rotated (e.g., by the motor 124) to provide a targeted view from the vehicle 50 (e.g., a field of view).

The capture device 102 may transform the received light signal IM into digital data (e.g., a bitstream). In some embodiments, the capture device 102 may perform an analog to digital conversion. For example, the capture device 102 may perform a photoelectric conversion of the light received by the lens 112. The capture device 102 may transform the bitstream into video data, a video file and/or video frames (e.g., perform encoding). For example, the video data may be a digital video signal. The digital video signal may comprise video frames (e.g., sequential digital images such as the video frame 300).

The video data of the targeted view from the vehicle 50 may be represented as the signal/bitstream/data VIDEO (e.g., a digital video signal). The capture device 102 may present the signal VIDEO to the processor 106. The signal VIDEO may represent the video frames/video data (e.g., the video frame 300). The signal VIDEO may be a video stream captured by the capture device 102. In some embodiments, the capture device 102 may be implemented in a camera. In some embodiments, the capture device 102 may be configured to add to existing functionality of a camera.

In some embodiments, the capture device 102 may be pre-installed at a pre-determined location and the camera system 100 may connect to the capture device 102. In other embodiments, the capture device 102 may be part of the camera system 100. The capture device 102 may be configured for blind spot monitoring, security monitoring, driver assistance, for insurance purposes, etc. In an example, the capture device 102 may detect accidents to provide evidence for insurance claims.

In some embodiments, the camera system 100 may be configured to leverage pre-existing functionality of the pre-installed capture device 102. The capture device 102 may be configured to perform depth sensing. The implementation of the capture device 102 may be varied according to the design criteria of a particular implementation.

In some embodiments, the capture device 102' may implement the camera sensor 120, the processor/logic 122 and/or the motor 124. The camera sensor 120 may receive light from the lens 112 and transform the light into digital data (e.g., the bitstream). For example, the camera sensor 120 may perform a photoelectric conversion of the light from the lens 112. The processor 122 may transform the bitstream into a human-legible content (e.g., video data). For example, the processor 122 may receive pure (e.g., raw) data from the camera sensor 120 and generate (e.g., encode) video data based on the raw data (e.g., the bitstream). The capture device 102' may have a memory to store the raw data and/or the processed bitstream. For example, the capture device 102' may implement a frame memory and/or buffer to store (e.g., provide temporary storage and/or cache) one or more of the video frames (e.g., the digital video signal). The processor 122 may perform analysis on the video frames stored in the memory/buffer of the capture device 102'.

The motor 124 may be configured to alter a direction of the lens 112 and/or the capture device 102'. The motor 124 may be configured to tilt, pan, zoom and/or rotate the lens 112 (e.g., change a physical direction of the lens 112). The motor 124 may adjust the orientation of the lens 112 in response to the signal CONTROL. In some embodiments, the motor 124 may be a component of the capture device 102'. For example, the motor 124 may be a servo. In some embodiments the motor 124 may be a component external to the capture device 102' that is configured to move the lens 112. The implementation of the motor 124 may be varied according to the design criteria of a particular implementation.

The interfaces 104a-104n may receive data from one or more components of the vehicle 50, the driver 152 and/or other components of the camera system 100 (e.g., the communication device 110). The signal STATUS may be generated in response to the data received from the components of the vehicle 50. In some embodiments, the interface 104a may receive data from the driver 152 (e.g., the input USER). The signal INPUT may be generated in response to the input USER from the driver 152. In some embodiments, the interfaces 104a-104n may receive data from the processor 106 (e.g., in response to objects detected by the processor 106 in the signal VIDEO, in response to decisions made by the processor 106, etc.). The interfaces 104a-104n may send data (e.g., instructions) from the processor 106 to the components of the vehicle 50. For example, the interfaces 104a-104n may be bi-directional.

In the example shown, the data received by the interface 104n may be the status information (e.g., data presented to the processor 106 as the signal STATUS). The status information may be used by the processor 106 to determine the vehicle state. In the example shown, the data received by the interface 104n from the components of the vehicle 50 may be a turn signal indicator, a position of the steering wheel, an angle of the bottom seat cushion, a mirror orientation, a speed of the vehicle, any information available from an on-board diagnostics (OBD) port of the vehicle 50, etc. (e.g., presented to the processor 106 as the signal STATUS). The type of data and/or the number of components of the vehicle 50 that provide data may be varied according to the design criteria of a particular implementation.

In some embodiments, information from the vehicle sensors 114 (e.g., a location module, an orientation module, a temperature module, etc.) may be received by the interfaces 104a-104n. In one example, the interfaces 104a-104n may be implemented as an electronic bus (e.g., a controller area network (CAN) bus) and the sensors 114 may be part of the vehicle 50. In another example, the interfaces 104a-104n may be implemented as an Ethernet interface. In yet another example, the interfaces 104a-104n may be implemented as an electronic device (e.g., a chip) with a CAN bus controller. In still another example, the interfaces 104a-104n may be provided for human interaction (e.g., buttons, speech detection, touchscreen, etc.). In some embodiments, the sensors 114 may connect directly to the processor 106 (e.g., the processor 106 may implement a CAN bus controller for compatibility, the processor 106 may implement a serial peripheral interface (SPI), the processor 106 may implement another interface, etc.). In some embodiments, the sensors 114 may connect to the memory 108.

The processor 106 may be configured to execute computer readable code and/or process information. The processor 106 may be configured to receive input and/or present output to the memory 108. The processor 106 may be configured to present and/or receive other signals (not shown). The number and/or types of inputs and/or outputs of the processor 106 may be varied according to the design criteria of a particular implementation.

The processor 106 may receive the signal VIDEO, the signal INPUT and/or the signal STATUS. The processor 106 may make a decision based on data received at input 116a-116n and/or other input. Data received at the input 116a-116n may comprise external signals generated in response to user input, external signals generated by the vehicle sensors 114 and/or internally generated signals such as signals generated by the processor 106 in response to analysis of the signal VIDEO and/or objects detected in the signal VIDEO. The processor 106 may adjust the video data (e.g., crop, digitally move, physically move the sensor 120, etc.) of the signal VIDEO. The processor 106 may generate the signal VIDEO_OUT in response data received by the input 116a-116n and/or the decision made in response to the data received by the input 116a-116n. The processor 106 may generate the signal CONTROL in response to the data received by the input 116a-116n and/or the decision made in response to data received by the input 116a-116n. The signal CONTROL may be presented by the processor 106, to the motor 124.

The signal VIDEO_OUT may be generated to provide an output for the electronic mirror 130 in response to the captured video frames (e.g., VIDEO) and one or more signals transmitted to the input 116a-116n (e.g., STATUS, INPUT, etc.). For example, the input USER may be sent to the processor 106 via the interface 104a in order to select between the various fields of view (e.g., by moving the capture window 302 and/or physically tilting the lens 112 to provide an alternate targeted view from the vehicle 50). Generally, the signal VIDEO_OUT may correspond to the data received at the input 116a-116n and/or analyzed by the processor 106.

The cropping performed by the processor 106 may be varied according to the design criteria of a particular implementation. For example, the signal VIDEO_OUT may be a processed (e.g., cropped) version of the signal VIDEO to fit the shape of the electronic mirror 130 and/or to emulate a reflective view from a conventional reflective mirror (e.g., a side view mirror, a rear view mirror, etc.). For example, the electronic mirror 130 may be implemented for real-time video streaming of the signal VIDEO_OUT received from the processor 106. Generally, the signal VIDEO_OUT is some view (or derivative of some view) captured by the capture device 102 (e.g., the video frame 300). In some embodiments, the signal VIDEO_OUT may provide a series of video frames that improves upon the reflective view from a conventional reflective mirror (e.g., provides night vision, provides High Dynamic Range (HDR) imaging, provides more viewing area, highlights detected objects, provides additional data such as a numerical distance of detected objects, etc.).

The memory 108 may store data. The memory 108 may be implemented as a cache, flash memory, DRAM memory, etc. The type and/or size of the memory 108 may be varied according to the design criteria of a particular implementation. The data stored in the memory 108 may correspond to a video file, status information (e.g., readings from the sensors 114, pre-selected fields of view, user preferences, user inputs, etc.) and/or metadata information.

The communication device 110 may send and/or receive data to/from the interfaces 104a-104n. In some embodiments the communication device 110 may be the OBD of the vehicle. In some embodiments, the communication device 110 may be implemented as a satellite (e.g., a satellite connection to a proprietary system). In one example, the communication device 110 may be a hard-wired data port (e.g., a USB port, a mini-USB port, a USB-C connector, HDMI port, an Ethernet port, a DisplayPort interface, a Lightning port, etc.). In another example, the communication device 110 may be a wireless data interface (e.g., Wi-Fi, Bluetooth, ZigBee, cellular, etc.).

The lens 112 (e.g., a camera lens) may be directed to provide a targeted view from the vehicle 50. The lens 112 may be aimed to capture environmental data (e.g., light). The lens 112 may be configured to capture and/or focus the light for the capture device 102. Generally, the sensor 120 is located behind the lens 112. Based on the captured light from the lens 112, the capture device 102 may generate a bitstream and/or video data.

The sensors 114 may be configured to determine a state of the vehicle 50. The number and/or types of data used to determine the state of the vehicle 50 may be varied according to the design criteria of a particular implementation. In one example, the location module may be used to determine an absolute location of the vehicle 50. In another example, the location module may be used to determine a direction of travel of the vehicle 50 (e.g., forward, reverse, idling, etc.). In yet another example, a speed sensor may be used to determine a velocity of the vehicle 50.

Data from the sensors 114 may be presented to the processor 106 as the signal STATUS. The number and/or types of the sensors 114 may be varied according to the design criteria of a particular implementation. The sensors 114 may be used by the camera system 100 to determine a movement direction of the vehicle (e.g., using information from turn signals of the vehicle 50 being activated and/or a movement direction and amount of movement of a steering wheel of the vehicle 50).

The signal STATUS may provide information for the camera system 100 (e.g., the status information) from various types of the vehicle sensors 114. In one example, location-related information may be determined by a location module (e.g., to determine weather conditions and/or road conditions for the current location of the vehicle 50). For example, the location module may be implemented as a GPS sensor. Orientation information may be determined by an orientation module. For example, the orientation module may be implemented as a magnetometer, an accelerometer and/or a gyroscope. In yet another example, temperature information may be determined by a temperature module. For example, the temperature module may be implemented as a thermometer.

The types of the sensors 114 used to implement the location module, the orientation module, the temperature module and/or any other types of sensors may be varied according to the design criteria of a particular implementation. In some embodiments, the signal STATUS may provide details about the vehicle 50.

Figure 7:
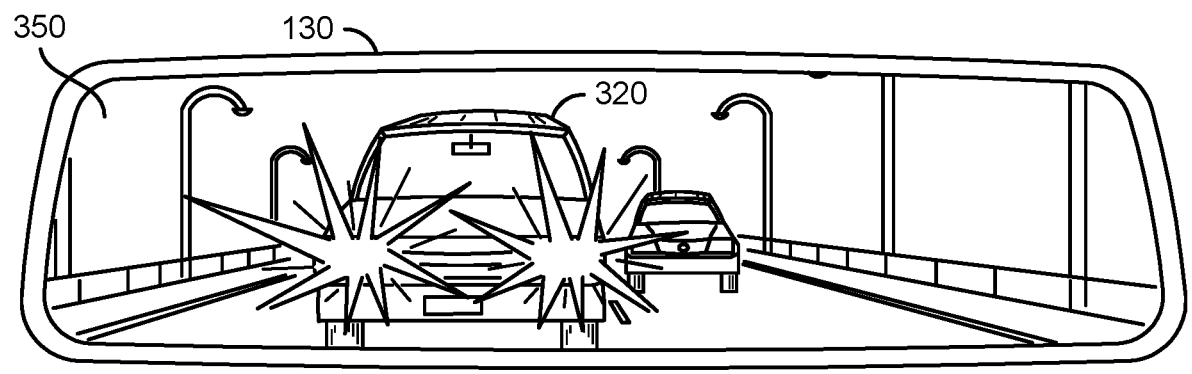
FIG. 7 is a diagram illustrating a rear-facing electronic mirror displaying a first field of view.

Referring to FIG. 7, a diagram illustrating a rear-facing mirror 130 displaying a first field of view 350 is shown in accordance with a preferred embodiment of the present invention. The field of view 350 is shown displayed on the electronic mirror 130. The field of view 350 may correspond with the capture window 302 described in connection with FIG. 6. For example, the tailing vehicle 320 is shown displayed on the electronic mirror 130.

The driver 152 may desire to change the field of view 350 displayed on the electronic mirror 130. For example, the headlights of the tailing vehicle 320 may cause a distraction to the driver 152. In one example, the driver 152 may provide the input USER to the interface 104a. The interface 104a may present the signal INPUT to the processor 106. The processor 106 may adjust the video data in the signal VIDEO to change the field of view sent in the signal VIDEO_OUT.

In some embodiments, the processor 106 may adjust the video data in the signal VIDEO by adjusting a physical direction (e.g., tilting, panning, rotating, changing orientation, etc.) of the lens 112. The processor 106 may generate the signal CONTROL in response to the signal INPUT. The signal CONTROL may be presented to the capture device 102 and cause the lens 112 to physically pan and/or tilt.

Figure 8:
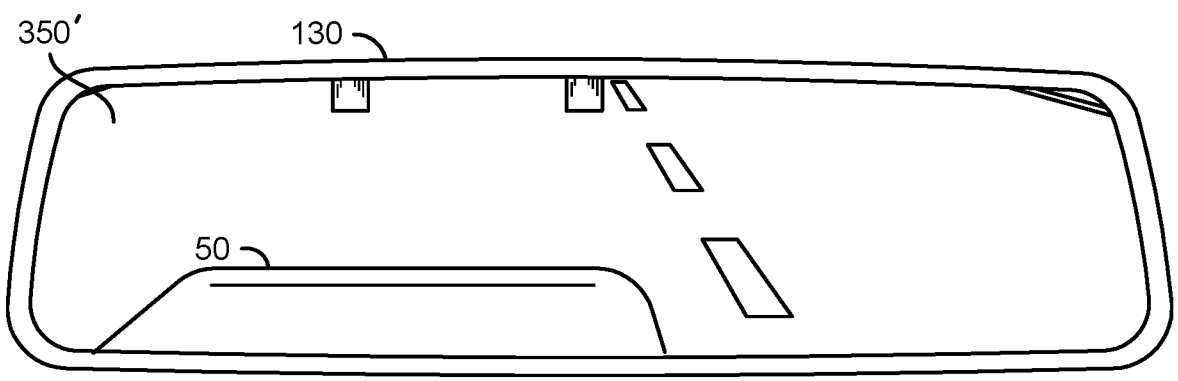
FIG. 8 is a diagram illustrating a rear-facing electronic mirror displaying a second field of view.

Referring to FIG. 8, a diagram illustrating the rear-facing electronic mirror 130 displaying a second field of view 350' is shown in accordance with a preferred embodiment of the present invention. The field of view 350' is shown displayed on the electronic mirror 130. The field of view 350' may correspond with the hidden portion 304b described in connection with FIG. 6.

The processor 106 may adjust the video data in the signal VIDEO by digitally moving (e.g., panning) the position of the capture window 302 (e.g., move the capture window 302 down). In the example shown, the capture window 302 may be moved down (e.g., to reduce the size of the hidden portion 304b to zero and extend the hidden portion 304a to cover the portion of the field of view 350). The processor 106 may crop out the resulting hidden portions (e.g., the hidden portion 304a) and transmit the cropped video signal VIDEO_OUT (e.g., the capture window 302) to the electronic mirror 130.

Figure 9:
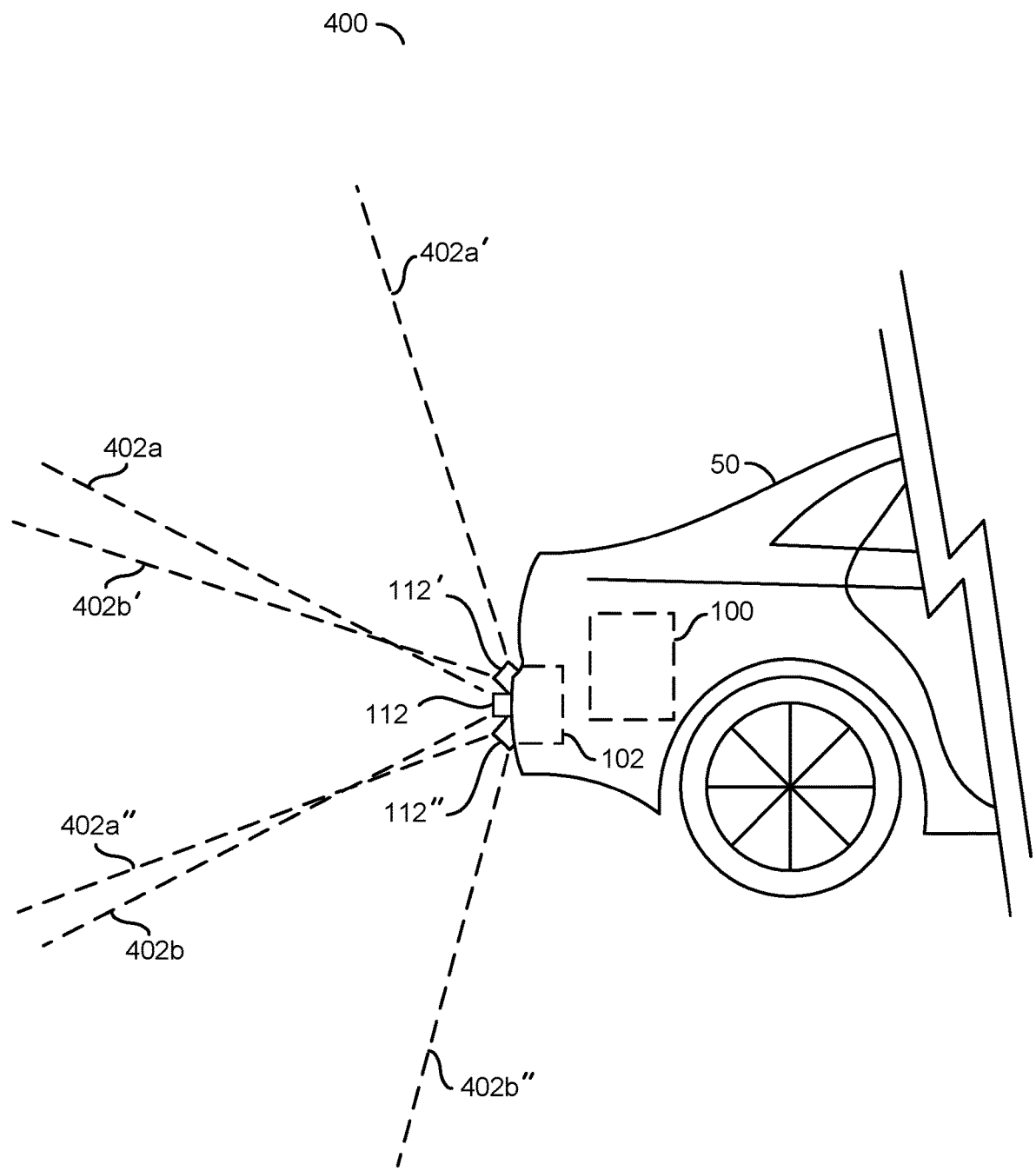
FIG. 9 is a diagram illustrating a physical adjustment of a rear-facing camera on a vehicle.

Referring to FIG. 9, a diagram 400 illustrating a physical adjustment of a rear-facing camera on the vehicle 50 is shown in accordance with a preferred embodiment of the present invention. The lens 112 is shown mounted on a rear end (e.g., a rear bumper) of the vehicle 50. A vertical profile of the field of view captured by the capture device 102 is shown as a line 402a and a line 402b. In an example, the orientation of the lens 112 with the vertical profile lines 402a-402b may be a default orientation for the lens 112. The processor 106 may be configured to generate the signal CONTROL to adjust the physical orientation of the lens 112.

In one example, the lens 112 may be physically tilted (e.g., rotated in a vertical plane) to point in an upward direction. The lens 112' shows the lens 112 directed in an upward direction. A vertical portion of the field of view of the upward directed lens 112' is shown as a line 402a' and a line 402b'. In an example, the processor 106 may generate the signal CONTROL to direct the lens 112' in the upward direction in response to the user data received at the input 116a (e.g., the signal INPUT). In another example, the processor 106 may generate the signal CONTROL to direct the lens 112' in the upward direction in response to the state of the vehicle received at the input 116*n* (e.g., the signal STATUS). The lens position 112' may provide an alternate targeted field of view from the vehicle 50.

In one example, the lens 112 may be physically tilted to point in a downward direction. The lens 112" shows the lens 112 directed in a downward direction. A vertical profile of the field of view of the downward directed lens 112" is shown as a line 402*a*" and a line 402*b*". In an example, the processor 106 may generate the signal CONTROL to direct the lens 112" in the downward direction in response to the user data received at the input 116*a* (e.g., the signal INPUT). In another example, the processor 106 may generate the signal CONTROL to direct the lens 112" in the downward direction in response to the state of the vehicle data received at the input 116*n* (e.g., the signal STATUS). For example, the signal STATUS may be generated in response the vehicle 50 traveling in reverse. The signal STATUS may indicate the reverse state of the vehicle 50 to the processor 106. The lens position 112" may provide an alternate targeted field of view from the vehicle 50.

Figure 10:
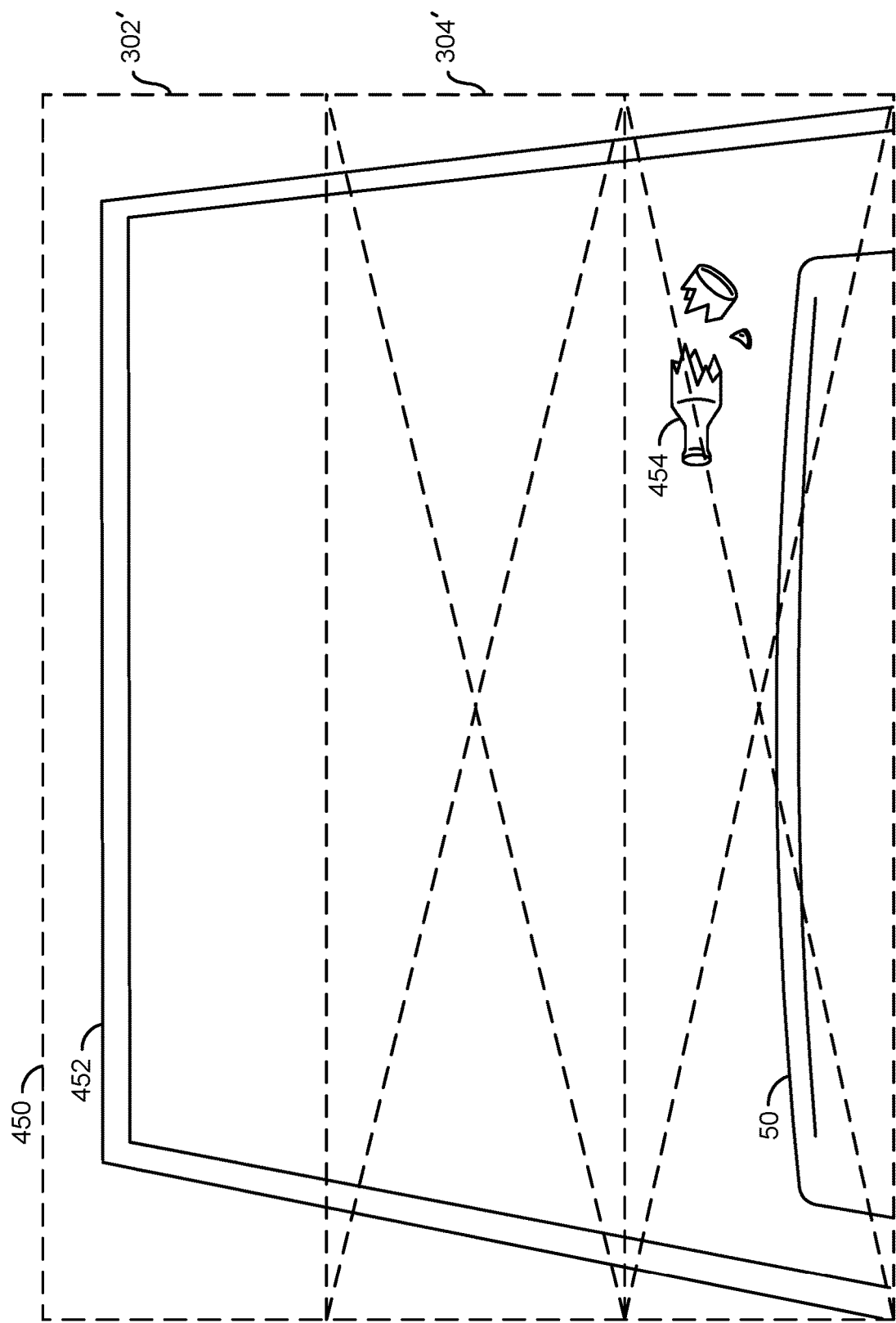
FIG. 10 is a diagram illustrating an alternate image captured by a sensor.

Referring to FIG. 10, a diagram illustrating an alternate image captured by the sensor 120 is shown in accordance with a preferred embodiment of the present invention. A video frame 450 is shown (e.g., one example video frame captured by the capture device 102). The example video frame 450 may be a targeted view captured by the lens 112*a* mounted on the rear bumper of the vehicle 50). The video frame 450 may be an image captured while the lens 112*a* is oriented in a downward direction (e.g., the lens 112*a* may be in the lens position 112"). For example, the video frame 300 may be an example of a video frame captured when the lens 112 is in the default orientation and the video frame 450 may be an example of a video frame captured when the capture device 102 has been physically directed to the lens position 112" to capture an alternate targeted view from the vehicle 50.

A portion of the rear bumper of the vehicle 50 is shown in the video frame 450. A parking spot 452 is shown in the video frame 450. A broken bottle 454 is shown in the video frame 450. In some embodiments, the lens 112*a* may physically tilt to the lens position 112" in response to the vehicle entering the reverse state. In some embodiments, the lens 112*a* may physically tilt to the lens position 112" in response to the data received at the input 116*a* from the driver 152. In some embodiments, the lens 112*a* may physically tilt to the lens position 112" in response to the driver 152 selecting a parking option (e.g., an option for automated parking). In some embodiments, the processor 112*a* may analyze the video frame 450, detect the parking spot 452 and then initiate the signal CONTROL to physically tilt the lens 112*a* to the lens position 112" to automatically provide the driver 152 with a field of view suitable for parking the vehicle 50.

The capture window 302' is shown as the top-most vertical portion of the video frame 450. The hidden portion 304' is shown as the bottom most portion of the video frame 450 (e.g., the hidden portion 304*a* has a vertical dimension of zero and the hidden portion 304' comprises the hidden portion 304*b*). The broken bottle 454 may be in the hidden portion 304'. Since the vertical profile of the electronic mirror 130 is limited, the broken bottle 454 may not be visible to the driver 152.

Figure 11:
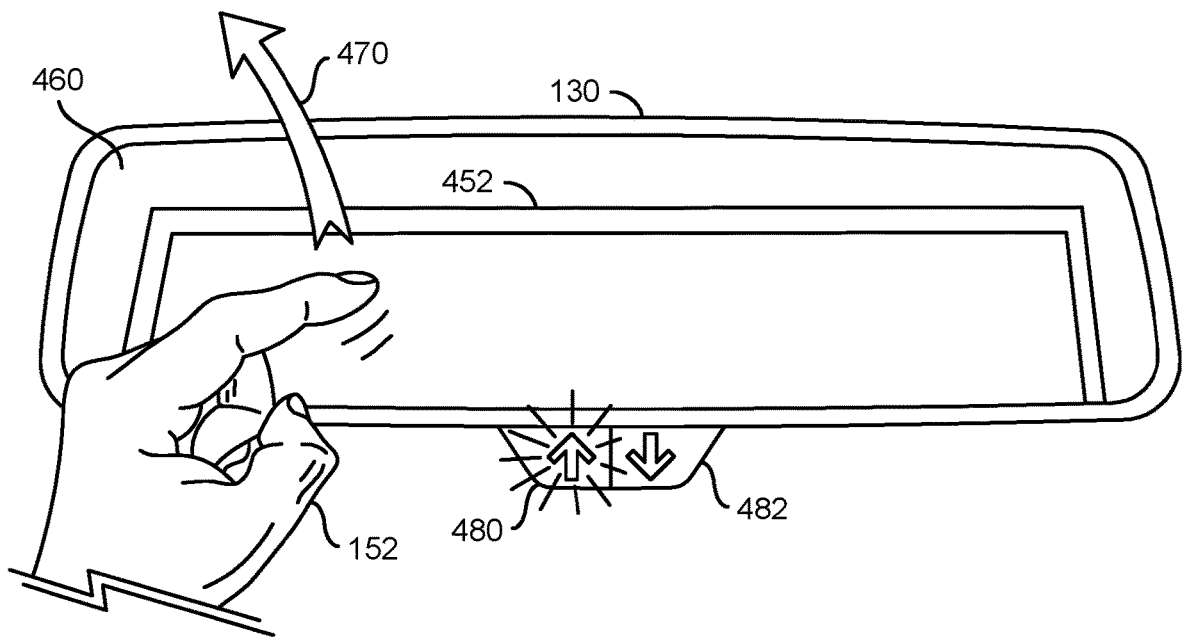
FIG. 11 is a diagram illustrating a user input to a rear-facing electronic mirror.

Referring to FIG. 11, a diagram illustrating a user input to the rear-facing electronic mirror 130 is shown. A field of view 460 is shown displayed on the electronic mirror 130. The field of view 460 may correspond with the capture window 302' described in connection with FIG. 10. For example, the end of the parking spot 452 is shown displayed on the electronic mirror 130.

The driver 152 may desire to change the field of view 460 displayed on the electronic mirror 130. For example, the driver 152 may want to see a field of view closer to the rear end of the vehicle 50. In some embodiments, the electronic mirror 130 may provide a touchscreen interface. The touchscreen interface may be the interface 104*a* configured to present the signal INPUT to the processor 106. The driver 152 is shown interacting with the touchscreen interface 104*a* of the electronic mirror 130. The driver 152 is shown making a swipe gesture 470 to scroll the field of view 460 downwards. For example, the swipe gesture 470 may be similar to swipe gestures used to control a smartphone (e.g., swipe up to scroll down, swipe down to scroll up, etc.).

An indicator 480 and an indicator 482 are shown. The indicator 480 may be an up indicator. The indicator 482 may be a down indicator. In some embodiments, the indicators 480-482 may be configured to illuminate in response to a field of view displayed on the electronic mirror 130. In some embodiments, the indicators 480-482 may implement buttons. In an example, the up indicator 480 may implement an up button and the down indicator 482 may implement a down button used to control the field of view 460 displayed on the electronic mirror 130. For example, the up button 480 and the down button 482 may implement the interface 104*a* (e.g., provide the signal INPUT to the processor 106).

In response to the signal INPUT received from the touchscreen interface 104*a* of the electronic mirror 130 (or the up button 480 or the down button 482), the processor 106 may adjust the field of view sent in the signal VIDEO_OUT. For example, the swipe gesture 470 may be used to move the capture window 302' of the video frame 450 to a lower position (e.g., to show part of the hidden portion 304' of the video frame 450). In another example, the down button may be used to move the capture window 302' of the video frame 450 to a lower position. In some embodiments, the swipe gesture 470 and/or the up/down buttons 480-482 may be used to physically tilt (or move) the lens 112. The type of input used to control the touchscreen interface of the electronic mirror 130 may be varied according to the design criteria of a particular implementation.

The up indicator 480 is shown illuminated. The illuminated up indicator 480 may indicate that the capture window 302' is at a top most portion of the video frame 450. When the driver 152 attempts to move the field of view further upwards (e.g., past the top most part of the video frame 450), there may not be any video frame data to display on the electronic mirror 130 (e.g., there is no additional data captured by the sensor 120 in the video frame). When there is no video frame data to display (e.g., the digital movement has reached a limit), the processor 106 may generate the signal CONTROL to physically tilt the camera upwards (e.g., to the lens position 112'). For example, the processor 106 may attempt to perform a digital movement (e.g., adjustment) of the capture window 302' as much as possible, and when the capture window 302' cannot be moved any further, the processor 106 may physically move (e.g., tilt, pan, rotate, zoom, etc.) the lens 112.

Figure 12:
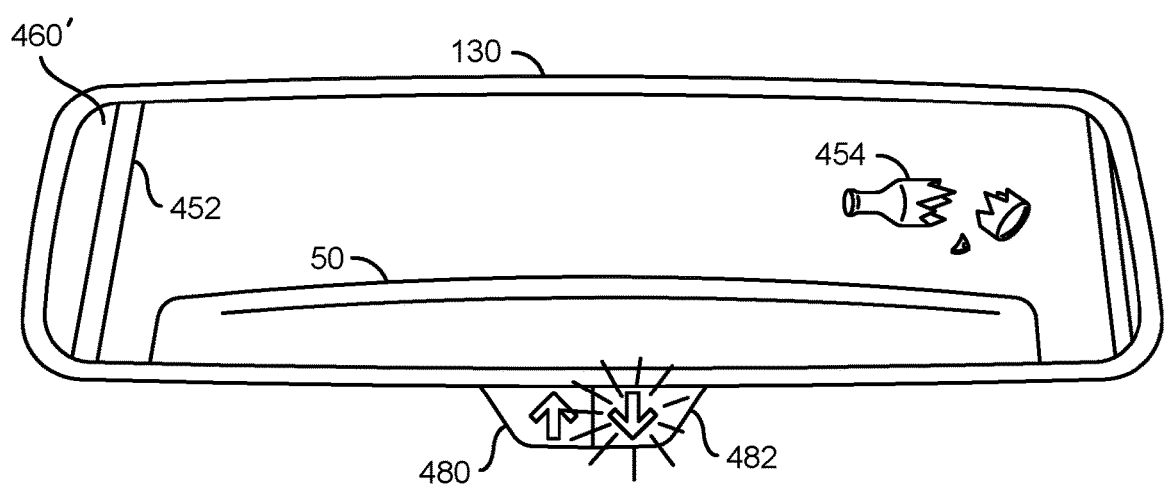
FIG. 12 is a diagram illustrating an adjustment to a display on the rear-facing electronic mirror in response to a user input.

Referring to FIG. 12, a diagram illustrating an adjustment to a display on the rear-facing electronic mirror 130 in response to a user input is shown. A field of view 460' is shown displayed on the electronic mirror 130. The field of view 460' may correspond with the hidden portion 304' described in connection with FIG. 10. For example, the parking spot 452, the vehicle 50 and the broken bottle 454 are shown displayed on the electronic mirror 130.

The field of view 460' displayed on the electronic mirror 130 may be displayed in response to the swipe gesture 470 and/or pressing the down button 482. For example, the processor 106 may move the capture window 302' down on the video frame 450 to display the hidden portion 304' in response to the signal INPUT (e.g., the capture window 302' is at a bottom most portion of the video frame 450 and the hidden portion 304' covers an upper portion of the video frame 450).

The down indicator 482 is shown illuminated. The illuminated down indicator 482 may indicate that the capture window 302' is at a bottom most portion of the video frame 450. When the driver 152 attempts to move the field of view further downwards (e.g., past the bottom most part of the video frame 450), there may not be any video frame data to display on the electronic mirror 130. When there is no video frame data to display (e.g., the digital movement has reached a limit), the processor 106 may generate the signal CONTROL to physically move (e.g., tilt) the camera downwards (e.g., to the lens position 112"). For example, the processor 106 may attempt to perform a digital movement of the capture window 302' as much as possible, and when the capture window 302' cannot be moved any further, the processor 106 may physically move the lens 112.

Adjusting the field of view (e.g., from the field of view 460 to the field of view 460') may allow the driver 152 to see different information. For example, the field of view 460 may provide the driver 152 with a view of the end of the parking space 452 to help ensure that the driver 152 is positioned correctly to back into the parking space 452 and/or to ensure the driver 152 has not left the vehicle 50 sticking out too far from the parking space 452. In another example, the field of view 460' may provide the driver 152 with a view of any obstacles and/or obstructions while traveling in reverse (e.g., the driver 152 may avoid the broken bottle 454 which may cause damage to the vehicle 50). The camera system 100 may allow the driver 152 to see various views depending on the individual preferences of the driver 152.

Figure 13:
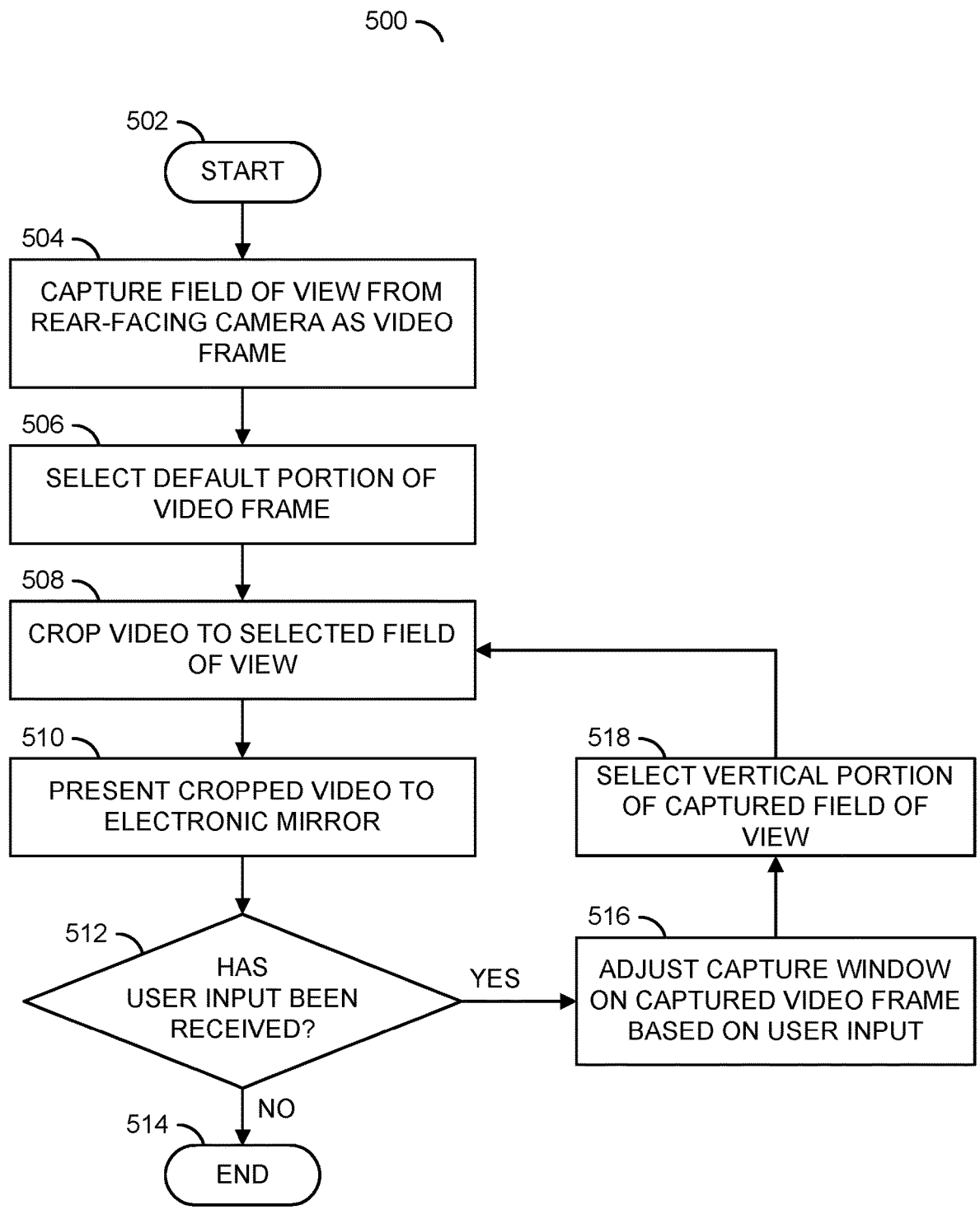
FIG. 13 is a flow diagram illustrating a method for performing a digital movement of a capture window based on a user input.

Referring to FIG. 13, a method (or process) 500 is shown. The method 500 may perform a digital movement of a capture window based on a user input. The method 500 generally comprises a step (or state) 502, a step (or state) 504, a step (or state) 506, a step (or state) 508, a step (or state) 510, a decision step (or state) 512, a step (or state) 514, a step (or state) 516, and a step (or state) 518.

The state 502 may start the method 500. Next, in the state 504, the sensor 120 may capture a field of view (e.g., the field of view defined by the lines 154a-154b and 202a-202b) from a rear-facing camera (e.g., the lens 112a and the capture device 102a) as the video frame 300. For example, the capture device 102a may present the signal VIDEO to the processor 106. In the state 506, the processor 106 may select a default portion of the video frame 300 (e.g., the capture window 302 may be positioned in a default position of the video frame 300). For example, the default position for the field of view may be a position determined to be used by most drivers in normal driving conditions. In another example, the default position for the field of view may be a position based on a height and/or body position of the driver 152. The default position may be varied according to the design criteria of a particular implementation. Next, the method 500 may move to the state 508.

In the state 508, the processor 106 may crop the video frame 300 to the selected field of view. The selected field of view may be determined by the position of the capture window 302. The cropped video may be the signal VIDEO_OUT. Next, in the state 510, the processor 106 may present the cropped video (e.g., the signal VIDEO_OUT) to the electronic mirror 130. Cropping the field of view may allow the video to conform to a shape of the electronic mirror 130. Next, the method 500 may move to the decision state 512.

In the decision state 512, the processor 106 may determine whether the user data received at the input 116a (e.g., the signal INPUT) has been received. If the user input has not been received, the method 500 may move to the state 514, which may end the method 500. If the user input has been received, the method 500 may move to the state 516. In the state 516, the processor 106 may adjust the capture window 302 on the captured video frame 300 based on the user input (e.g., the signal INPUT). Next, in the state 518, the processor 106 may select a vertical portion of the captured field of view. Next, the method 500 may return to the state 508.

Figure 14:
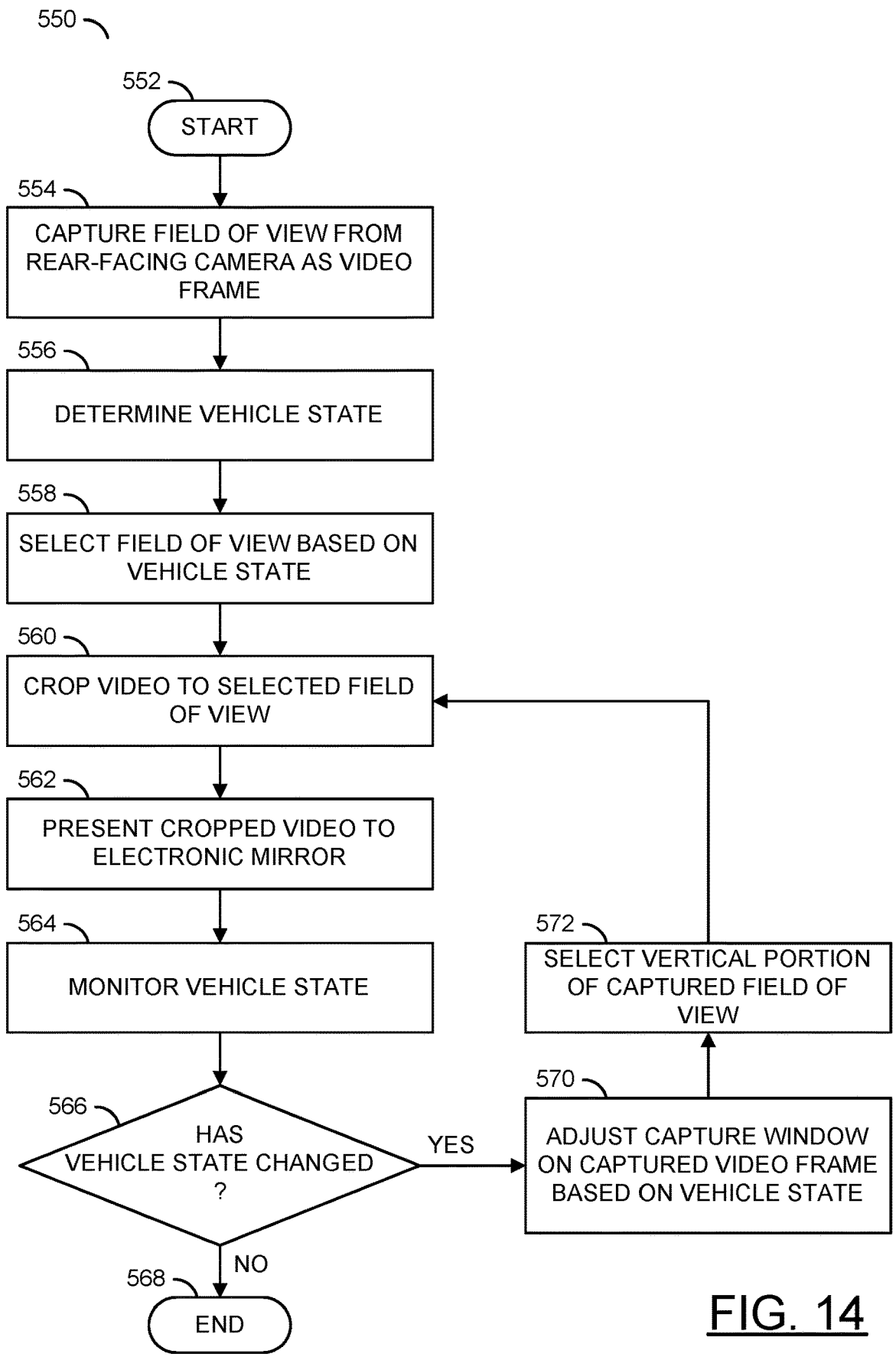
FIG. 14 is a flow diagram illustrating a method for performing a digital movement of a capture window based on a vehicle state.

Referring to FIG. 14, a method (or process) 550 is shown. The method 550 may perform a digital movement (e.g., tilt and/or pan) of a capture window based on the vehicle state data received at the input 116n. The method 550 generally comprises a step (or state) 552, a step (or state) 554, a step (or state) 556, a step (or state) 558, a step (or state) 560, a step (or state) 562, a step (or state) 564, a decision step (or state) 566, a step (or state) 568, a step (or state) 570, and a step (or state) 572.

The state 552 may start the method 550. Next, in the state 554, the sensor 120 may capture a field of view (e.g., the field of view defined by the lines 154a-154b and 202a-202b) from a rear-facing camera (e.g., the lens 112a and, the capture device 102a) as the video frame 300. For example, the capture device 102a may present the signal VIDEO to the processor 106. In the state 556, the processor 106 may determine a vehicle state (e.g., based on the signal STATUS). Next, in the state 558, the processor 106 may select a field of view based on the vehicle state (e.g., select the capture window 302 of the video frame 300). Next, the method 550 may move to the state 560.

In the state 560, the processor 106 may crop the video to the selected field of view. Next, in the state 562, the processor 106 may present the cropped video (e.g., the signal VIDEO_OUT) to the electronic mirror 130. Cropping the field of view may allow the video to conform to a shape of the electronic mirror 130. In the state 564, the processor may monitor the vehicle state (e.g., the signal STATUS). Next, the method 550 may move to the decision state 566.

In the decision state 566, the processor 106 may determine whether the vehicle state has changed (e.g., monitor status information from the signal STATUS received from the interface 104n). If the vehicle state has not changed, the method 550 may move to the state 568, which may end the method 550. If the vehicle state has changed, the method 550 may move to the state 570. In the state 570, the processor 106 may adjust the capture window 302 on the captured video frame 300 based on the vehicle state. Next, in the state 572, the processor 106 may select a vertical portion of the captured field of view. Next, the method 550 may return to the state 560.

Figure 15:
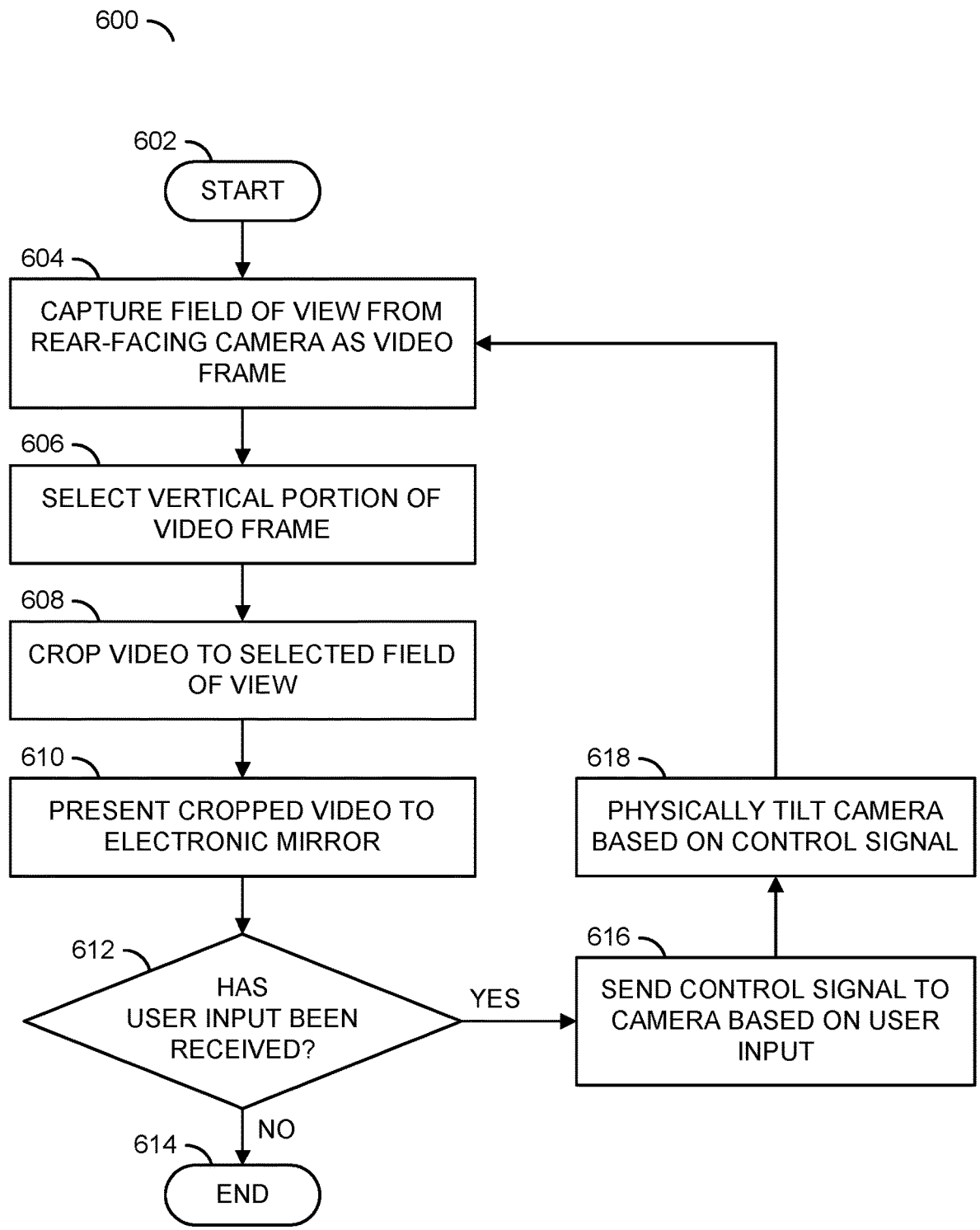
FIG. 15 is a flow diagram illustrating a method for physically tilting a camera in response to a user input.

Referring to FIG. 15, a method (or process) 600 is shown. The method 600 may physically tilt a camera in response to a user input. The method 600 generally comprises a step (or state) 602, a step (or state) 604, a step (or state) 606, a step (or state) 608, a step (or state) 610, a decision step (or state) 612, a step (or state) 614, a step (or state) 616, and a step (or state) 618.

The state 602 may start the method 600. Next, in the state 604, the sensor 120 may capture a field of view (e.g., the field of view defined by the lines 154a-154b and 202a-202b) from a rear-facing camera (e.g., the lens 112a and the capture device 102a) as the video frame 300. For example, the capture device 102a may present the signal VIDEO to the processor 106. In the state 606, the processor 106 may select a vertical portion of the video frame 300. Next, in the state 608, the processor 106 may crop the video to the selected field of view. Next, in the state 610, the processor 106 may present the cropped video (e.g., the signal VIDEO_OUT) to the electronic mirror 130. Cropping the field of view may allow the video to conform to a shape of the electronic mirror 130. Next, the method 600 may move to the decision state 612.

In the decision state 612, the processor 106 may determine whether the user data received at the input 116a has been received (e.g., monitor the interface 104a for the signal INPUT). If the user input has not been received, the method 600 may move to the state 614, which may end the method 600. If the user input has been received, the method 600 may move to the state 616. In the state 616, the processor 106 may send the control signal (e.g., CONTROL) to the camera (e.g., the lens 112a and the capture device 102a) based on the user input. Next, in the state 618, the processor 106 may physically tilt the camera based on the control signal. Next, the method 600 may return to the state 604.

Figure 16:
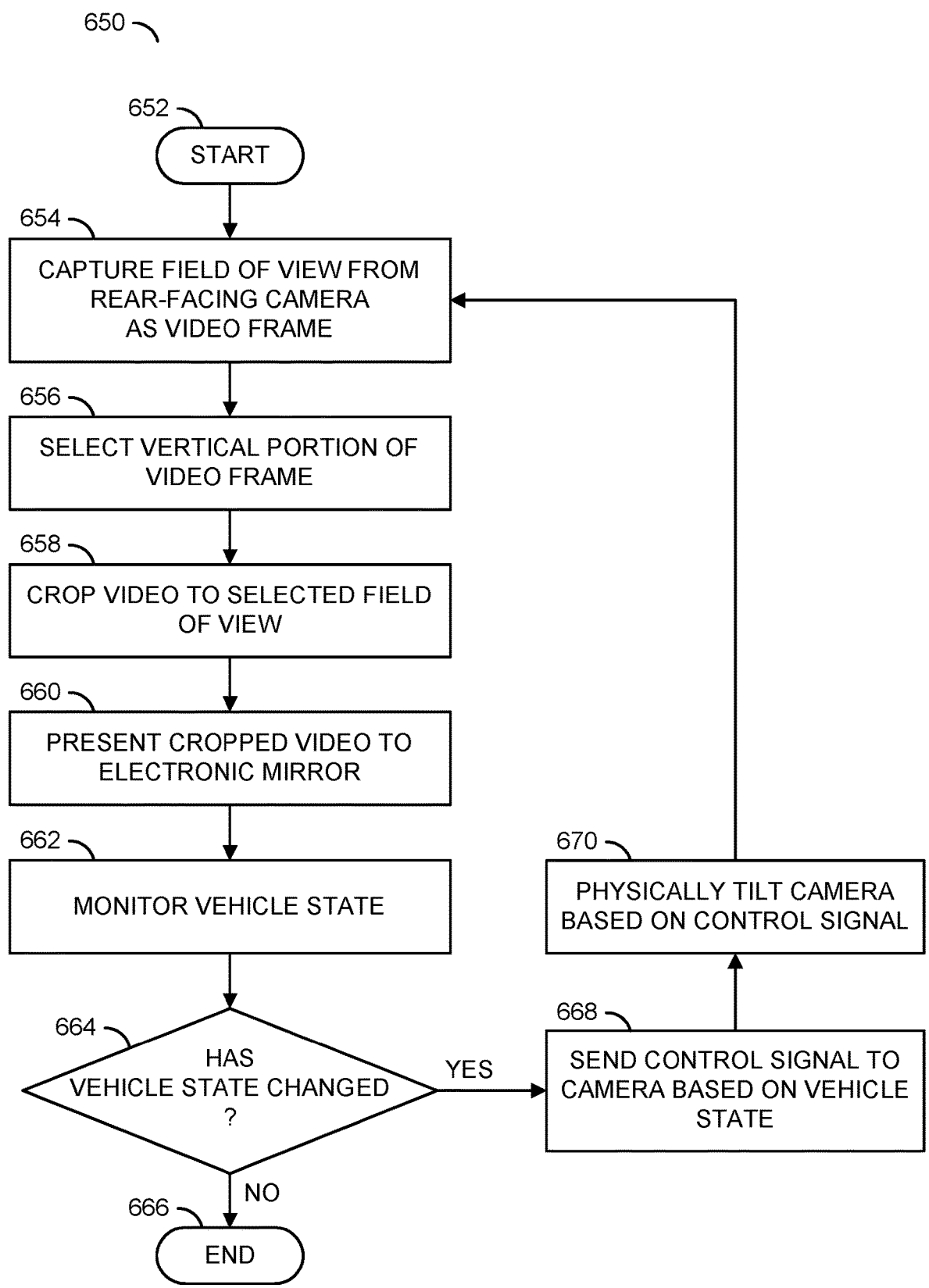
FIG. 16 is a flow diagram illustrating a method for physically tilting a camera in response to a vehicle state.

Referring to FIG. 16, a method (or process) 650 is shown. The method 650 may physically move a camera in response to a vehicle state. The method 650 generally comprises a step (or state) 652, a step (or state) 654, a step (or state) 656, a step (or state) 658, a step (or state) 660, a step (or state) 662, a decision step (or state) 664, a step (or state) 666, a step (or state) 668, and a step (or state) 670.

The state 652 may start the method 650. Next, in the state 654, the sensor 120 may capture a field of view (e.g., the field of view defined by the lines 154a-154b and 202a-202b) from a rear-facing camera (e.g., the lens 112a and the capture device 102a) as the video frame 300. For example, the capture device 102a may present the signal VIDEO to the processor 106. In the state 606, the processor 106 may select a vertical portion of the video frame 300. Next, in the state 658, the processor 106 may crop the video to the selected field of view. Next, in the state 660, the processor 106 may present the cropped video (e.g., the signal VIDEO_OUT) to the electronic mirror 130. Cropping the field of view may allow the video to conform to a shape of the electronic mirror 130. In the state 662, the processor 106 may monitor the vehicle state data received at the input 116n (e.g., the signal STATUS from the interface 104n). Next, the method 650 may move to the decision state 664.

In the decision state 664, the processor 106 may determine whether the vehicle state has changed. If the vehicle state has not changed, the method 650 may move to the state 666, which may end the method 650. If the vehicle state has changed, the method 650 may move to the state 668. In the state 668, the processor 106 may send the control signal (e.g., CONTROL) to the camera based on the vehicle state (e.g., the signal STATUS). Next, in the state 670, the motor 124 may physically tilt the camera based on the control signal. Next, the method 650 may return to the state 654.

Figure 17:
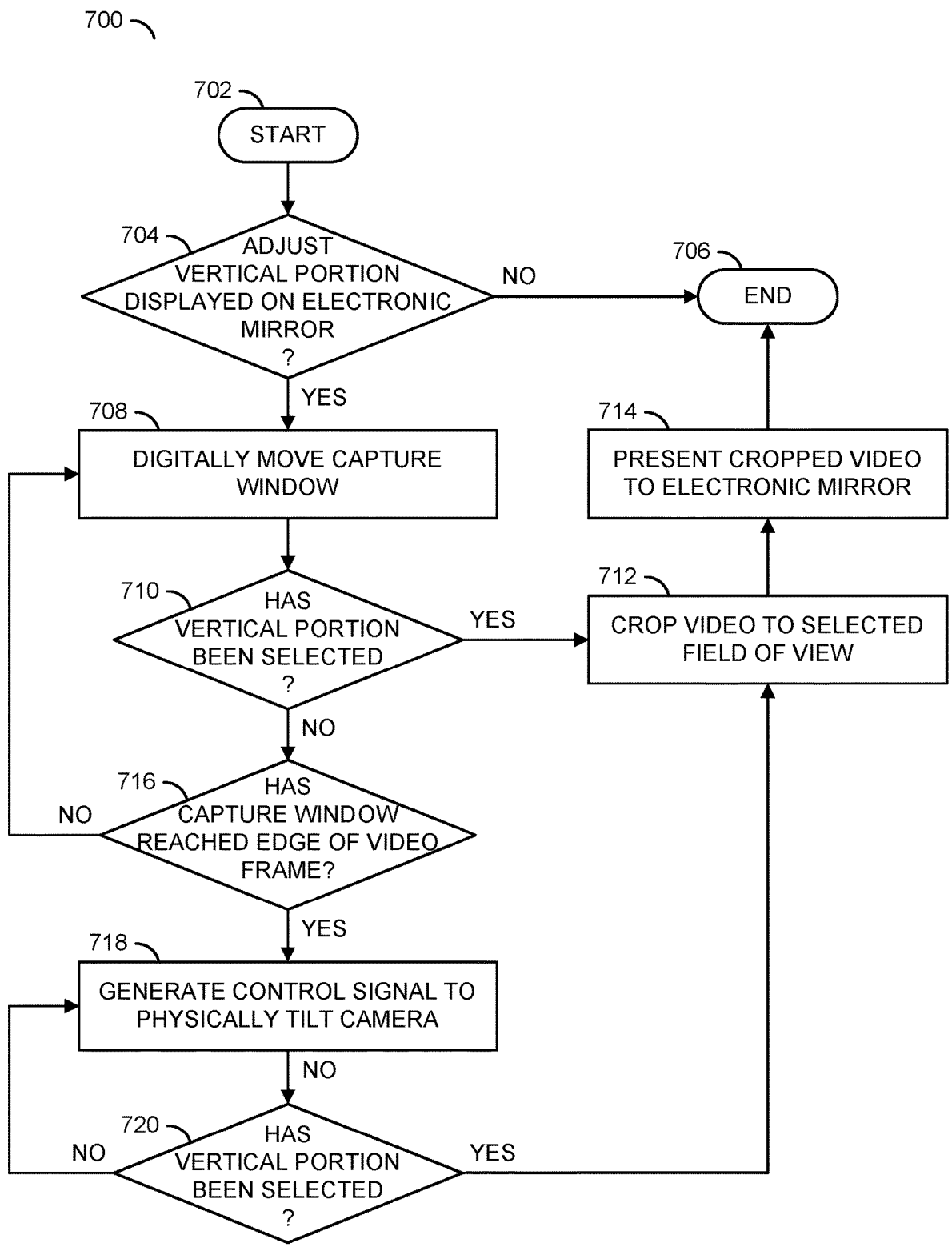
FIG. 17 is a flow diagram illustrating a method for digitally moving a capture window and physically moving a camera to adjust a field of view displayed on an electronic mirror.

Referring to FIG. 17, a method (or process) 700 is shown. The method 700 may digitally move a capture window and physically move a camera to adjust a field of view displayed on the electronic mirror 130. The method 700 generally comprises a step (or state) 702, a decision step (or state) 704, a step (or state) 706, a step (or state) 708, a decision step (or state) 710, a step (or state) 712, a step (or state) 714, a decision step (or state) 716, a step (or state) 718, and a decision step (or state) 720.

The state 702 may start the method 700. Next, the method 700 may move to the decision state 704. In the decision state 704, the processor 106 may determine whether to adjust the vertical portion of the video frame 300 to display on the electronic mirror 130 (e.g., based on the signal INPUT and/or the signal STATUS). If the processor 106 makes a determination not to adjust the vertical portion of the video frame 300 displayed on the electronic mirror 130, the method 700 may move to the state 706. The state 706 may end the method 700.

If the processor 106 makes a determination to adjust the vertical portion of the video frame 300 displayed on the electronic mirror 130, the method 700 may move to the state 708. In the state 708, the processor 106 may digitally move the capture window 302 on the video frame 300. Next, the method 700 may move to the decision state 710. In the decision state 710, the processor 106 may determine whether the vertical portion has been selected. For example, the processor 106 may determine whether the vertical portion has been selected by the capture window 302 based on the user data received by the input 116a (e.g., the driver 152 continues to make the swipe gesture 470 and/or the driver 152 is still holding down one of the buttons 480-482) and/or based on the vehicle status data received at the input 116n.

In the decision state 710, if the processor 106 determines the vertical portion has been selected, the method 700 may move to the state 712. In the state 712, the processor 106 may crop the video to the selected field of view (e.g., the field of view 350). Next, in the state 714, the processor 106 may present the cropped video (e.g., the signal VIDEO_OUT) to the electronic mirror 130. Cropping the field of view may allow the video to conform to a shape of the electronic mirror 130. Next, the method 700 may move to the state 706.

In the decision state 710, if the processor 106 determines the vertical portion has not been selected, the method 700 may move to the decision state 716. In the decision state 716, the processor 106 may determine whether the capture window 302 has reached an edge of the video frame 300 (e.g., the bottom most or top most portion of the video frame 300). For example, if the capture window 302 is at the bottom most portion of the video frame 300 and the driver 152 continues to swipe the touchscreen interface 104a to move the field of view downwards. In another example, if the capture window 302 is at the top most portion of the video frame 300 and the driver 152 continues to swipe the touchscreen interface 104a to move the field of view upwards. If the capture window 302 has not reached the edge of the video frame 300, the method 700 may return to the state 708. If the capture window 302 has reached the edge of the video frame 300, the method 700 may move to the state 718.

In the state 718, the processor 106 may generate the control signal (e.g., CONTROL) to physically tilt the camera. Next, the method 700 may move to the decision state 720. In the decision state 720, the processor 106 may determine whether the vertical portion has been selected (e.g., by the capture window 302). If the vertical portion has not been selected, the method 700 may return to the state 718. If the vertical portion has been selected, the method 700 may move to the state 712.

The camera system 100 may be configured to allow the camera (e.g., the lens 112 and/or the capture device 102) to physically rotate vertically to alter the field of view captured (e.g., and displayed on the electronic mirror 130). The direction of the lens 112 may be adjusted by user action (e.g., the input USER) and/or automatically (e.g., based on information from the vehicle sensors 114). For example, if the rear-view electronic mirror 130 is implemented as a touch screen device, the driver 152 may drag a finger from top to bottom on the display 130 to send input to the system to vertically adjust the pitch of the lens 112.

In another example, the adjustment by the motor 124 to perform a vertical movement (e.g., tilt) of the camera may be activated by monitoring the state of the vehicle 50. For example, if the vehicle 50 is placed into reverse (e.g., a vehicle state indicates the transmission of the vehicle 50 is shifted into reverse) the processor 106 may present a field of view that enables the driver 152 to have more visibility behind the vehicle 50 at a closer proximity (e.g., the lens position 112" which may show a lower angle view such as the video frame 450). The motor 124 may be activated to adjust the pitch of the camera module downward.

The camera system 100 may allow for a digital panning action (e.g., moving the capture window 302) to make use of different areas of the plane of the sensor 120 to alter the field of view presented to the electronic mirror 130. The steps executed by the processor 106 to adjust the active display window digitally from the sensor 120 input may be similar to the approaches used for physically tilting the lens 112. In some embodiments, the camera system 100 may be configured to both physically tilt the lens 112 and perform a digital movement of the capture window 302.

The functions and structures illustrated in the diagrams of FIGS. 13 to 17 may be designed, modeled, emulated, and/or simulated using one or more of a conventional general purpose processor, digital computer, microprocessor, microcontroller, distributed computer resources and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example non-transitory storage media, and may be executed by one or more of the processors sequentially or in parallel.

Embodiments of the present invention may also be implemented in one or more of ASICs (application specific integrated circuits), FPGAs (field programmable gate arrays), PLDs (programmable logic devices), CPLDs (complex programmable logic device), sea-of-gates, ASSPs (application specific standard products), and integrated circuits. The circuitry may be implemented based on one or more hardware description languages. Embodiments of the present invention may be utilized in connection with flash memory, nonvolatile memory, random access memory, read-only memory, magnetic disks, floppy disks, optical disks such as DVDs and DVD RAM, magneto-optical disks and/or distributed storage systems.

While the invention has been particularly shown and described with reference to the preferred embodiments thereof, it will be understood by those skilled in the art that various changes in form and details may be made without departing from the scope of the invention.

The invention claimed is:

1. An apparatus comprising:
   an interface to a sensor, said sensor configured to generate a video signal having a first field of view based on a horizontal dimension and a vertical dimension corresponding to an aspect ratio of said sensor; and
   a processor configured to (A) receive said video signal from said interface, (B) generate a second field of view from said video signal based on (i) said first field of view and (ii) a width and a height corresponding to an aspect ratio of a display and (C) present said second field of view to said display, wherein (a) said second field of view is a cropped version of said first field of view configured to show a first vertical portion of said vertical dimension that fits said height of said display, (b) said second field of view is generated by adjusting video data in said first field of view, (c) said aspect ratio of said sensor is different than said aspect ratio of said display and (d) cropping said first field of view in response to said difference between said aspect ratio of said sensor and said aspect ratio of said display enables said display to show said second field of view without distorting said video data.

2. The apparatus according to claim 1, wherein said adjusting said video data in said first field of view comprises performing a digital movement of a capture window of said video data.

3. The apparatus according to claim 2, wherein (i) said capture window is used to select said second field of view, (ii) said video data in said first field of view outside of said capture window comprises a second vertical portion that is a hidden portion captured by said sensor that does not fit said aspect ratio of said display and (iii) said hidden portion is cropped out of said second field of view.

4. The apparatus according to claim 2, wherein said capture window has a shape conforming to said width and said height of said display.

5. The apparatus according to claim 4, wherein (i) said width of said shape is larger than said height of said shape and (ii) said shape of said capture window comprises said first vertical portion of said vertical dimension and said horizontal dimension of said first field of view.

6. The apparatus according to claim 1, wherein a second vertical portion of said first field of view is not in said second field of view in response to said difference between said aspect ratio of said display and said aspect ratio of said sensor.

7. The apparatus according to claim 6, wherein said cropping removes said second vertical portion of said first field of view to generate said second field of view.

8. The apparatus according to claim 1, wherein said second field of view is further based on an input.

9. The apparatus according to claim 8, wherein said input comprises vehicle sensor information received from a vehicle.

10. The apparatus according to claim 9, wherein said vehicle sensor information comprises a body position of a driver.

11. The apparatus according to claim 8, wherein said input comprises a user input.

12. The apparatus according to claim 1, wherein said display replaces a reflective rear-view mirror.

13. The apparatus according to claim 1, wherein said first field of view comprises a view in a direction of a rear end of a vehicle.

14. The apparatus according to claim 1, wherein said display emulates a reflective rear-view mirror.

15. The apparatus according to claim 1, wherein said apparatus comprises a system on a chip (SoC).

16. The apparatus according to claim 1 wherein said display comprises an electronic mirror for a vehicle.

17. The apparatus according to claim 1, wherein said apparatus is configured to adjust a field of view displayed on an electronic mirror using an automobile state.

18. The apparatus according to claim 1, wherein said apparatus is configured to adjust a field of view displayed on an electronic mirror in response to a driver action.

19. An apparatus comprising:
- a sensor configured to generate a video signal having a first field of view based on a horizontal dimension and a vertical dimension corresponding to an aspect ratio of said sensor; and
- a processor configured to (A) receive said video signal, (B) generate a second field of view from said video signal based on (i) said first field of view and (ii) a width and a height corresponding to an aspect ratio of a display and (C) present said second field of view to said display, wherein (a) said second field of view is a cropped version of said first field of view configured to show a first vertical portion of said vertical dimension that fits said height of said display, (b) said second field of view is generated by adjusting video data in said first field of view, (c) said aspect ratio of said sensor is different than said aspect ratio of said display and (d) cropping said first field of view in response to said difference between said aspect ratio of said sensor and said aspect ratio of said display enables said display to show said second field of view without distorting said video data.

20. The apparatus according to claim 19, wherein a second vertical portion of said first field of view is not in said second field of view in response to said difference between said aspect ratio of said display and said aspect ratio of said sensor.

* * * * *